United States Patent
Schiller et al.

(10) Patent No.: US 6,442,573 B1
(45) Date of Patent: Aug. 27, 2002

(54) METHOD AND APPARATUS FOR DISTRIBUTING PICTURE MAIL TO A FRAME DEVICE COMMUNITY

(75) Inventors: Dean Schiller, Glendale; Paul Yanover, Los Angeles, both of CA (US)

(73) Assignee: Ceiva Logic, Inc., Burbank, CA (US)

( * ) Notice: Subject to any disclaimer, the term of this patent is extended or adjusted under 35 U.S.C. 154(b) by 0 days.

(21) Appl. No.: 09/458,849

(22) Filed: Dec. 10, 1999

(51) Int. Cl.$^7$ .............................. G06F 15/00
(52) U.S. Cl. ............... 707/500.1; 709/218; 358/403; 345/719
(58) Field of Search ............... 345/302, 327, 345/719; 709/218, 215; 713/2; 707/500.1; 358/403

(56) References Cited

U.S. PATENT DOCUMENTS

| | | | |
|---|---|---|---|
| 4,742,345 A | * 5/1988 | Santo et al. | 345/107 |
| 5,394,166 A | 2/1995 | Shimada | 345/98 |
| 5,448,372 A | * 9/1995 | Axman et al. | 358/403 |
| 5,561,531 A | * 10/1996 | Funazaki | 358/403 |
| 5,612,741 A | 3/1997 | Loban et al. | 248/383 |
| 5,680,535 A | * 10/1997 | Harbin et al. | 345/473 |
| 5,706,457 A | * 1/1998 | Dwyer et al. | 345/835 |

(List continued on next page.)

FOREIGN PATENT DOCUMENTS

| | | | | |
|---|---|---|---|---|
| WO | 92/05657 | * | 2/1992 | H04N/1/21 |
| WO | 95/30300 | * | 11/1995 | H04M/11/00 |
| WO | 95/31872 | * | 11/1995 | H04N/7/10 |
| WO | 96/29639 | * | 9/1996 | G06F/1/00 |
| WO | 97/47106 | * | 12/1997 | H04L/9/00 |
| WO | 98/04088 | * | 1/1998 | |
| WO | 98/26548 | * | 6/1998 | H04L/29/06 |
| WO | 99/04342 | * | 1/1999 | G06F/13/00 |
| WO | 99/44339 | * | 9/1999 | H04L/12/28 |
| WO | 99/54663 | * | 10/1999 | G06F/12/00 |
| WO | 99/56447 | * | 11/1999 | H04M/1/00 |
| WO | 00/29960 | * | 5/2000 | G06F/13/00 |

OTHER PUBLICATIONS

Hagawara–Sys–Com, "LUKIS (TM) JPEG Image Viewer (product information)," web page downloaded from www.h-scus.com/prod03 No. n/a, pp. 1–2, Apr. 2001.*

(List continued on next page.)

Primary Examiner—Heather R. Herndon
Assistant Examiner—Jeffrey A. Rossi
(74) Attorney, Agent, or Firm—The Hecker Law Group

(57) ABSTRACT

A method and apparatus for distributing picture mail to a frame device community is described. The present invention comprises one or more interconnected frame devices. Each frame device has a display region (e.g. an LCD) surrounded with a border region modeled to resemble a traditional picture frame. The border region may be comprised of wood, plastic, or any other aesthetically pleasing compound. Each frame device is configured to connect to an interconnection fabric to periodically obtain image data from a centralized repository and then display that data according to criteria established by an authorized user. The data repository is populated with image data via the image collection process. In one or more embodiments of the invention, the user may specify filter criteria which establishes what network addresses (e.g. picture mail address) are authorized to populate the data repository. The filter criteria and other information such as the behavior characteristics of each frame device are established and/or managed via a picture box. The picture box resides on a server computer and may be obtained by the user upon demand.

17 Claims, 12 Drawing Sheets

U.S. PATENT DOCUMENTS

| | | | | |
|---|---|---|---|---|
| 5,708,826 A | | 1/1998 | Ikeda et al. | 707/501.1 |
| 5,740,549 A | * | 4/1998 | Reilly et al. | 705/14 |
| 5,760,916 A | * | 6/1998 | Dellert et al. | 358/403 |
| 5,838,906 A | | 11/1998 | Doyle et al. | 709/202 |
| 5,862,297 A | * | 1/1999 | Timmermans | 358/403 |
| 5,864,387 A | * | 1/1999 | Reed et al. | 355/40 |
| 5,870,172 A | | 2/1999 | Blume | 708/105 |
| 5,898,600 A | | 4/1999 | Isashi | 708/105 |
| 5,905,492 A | | 5/1999 | Straub et al. | 345/744 |
| 5,913,088 A | | 6/1999 | Moghadam et al. | 396/311 |
| 5,923,736 A | | 7/1999 | Shachar | 379/93.17 |
| 5,923,738 A | | 7/1999 | Cardillo, IV et al. | 379/93.25 |
| 5,930,501 A | * | 7/1999 | Neil | 345/619 |
| 6,005,690 A | * | 12/1999 | Suzuki et al. | 358/403 |
| 6,025,827 A | * | 2/2000 | Bullock et al. | 707/500.1 |
| 6,037,989 A | * | 3/2000 | Kim | 348/441 |
| 6,058,428 A | * | 5/2000 | Wang et al. | 709/218 |
| 6,067,566 A | * | 5/2000 | Moline | 709/218 |
| 6,111,586 A | * | 8/2000 | Ikeda et al. | 345/619 |
| 6,167,469 A | * | 12/2000 | Safai et al. | 710/62 |
| 6,199,106 B1 | * | 3/2001 | Shaw et al. | 709/217 |

OTHER PUBLICATIONS

Kodak, Inc. Smart Picture Frame ... for the Story Box (TM) Network (product description), downloaded from www.kodak.com/US/en/digital/assessories/smartFrame/ on Apr. 2001 (7 p. reprint).*

Heather Newman Free Press Staff, W., "Nifty Ways You Can Soup up Your Machine," Detroit Free Press No.—, pp. 3E, Aug. 1999.*

Anonymous, "Visions of the Future," Blaricum, Neatherlands: V+K Publishing No. ISBN 90 6611 591 2, pp. 12–13, Dec. 1996 (reprinted 1998).*

Takashi, D. "Doing Fieldwork In the High Tech Jungle", The Wall Street Journal, p. B1 & B22, Oct. 27, 1998.*

Kirschner, S. K., "Ideas that stick," Popular Science, vol. 254 No. 2, pp. 27, Feb. 1999.*

Okamoto et al., "Reproducing Device", translation of WO 99/54663, as provided by Ralph McElroy Translation Company (Washington DC), pp. 1–15+Figures.*

* cited by examiner

METHOD AND APPARATUS FOR DISTRIBUTING PICTURE MAIL TO A FRAME DEVICE COMMUNITY

FIELD OF THE INVENTION

This invention relates to the field of computer software. More specifically, the invention relates to a method and apparatus for distributing picture mail to a frame device community.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyrights whatsoever.

BACKGROUND

Traditional Picture Frames

Picture frames provide a visually pleasing way to present photographs for display. People typically prefer to use picture frames, rather than digital display mechanisms (e.g. computer monitors), because of the aesthetic qualities associated with such frames. However, several problems and disadvantages result from the use of traditional picture frames.

For example, a problem that may be encountered by picture frame users is that changing the picture in the frame requires a series of manual steps. For example, a person who wishes to change the picture must manually remove the picture and replace it with a new one. Consequently, changing the picture requires that a person be physically located at the same place where the picture frame resides.

An additional problem with picture frames is that the frame does not have the ability to adjust the dimensions and/or size of the picture to fit within the display area. Pictures placed into the picture frame must correspond to the dimensions of the frame's display area. One prior art attempt to overcome these limitations is the use of various type of digital display device. The following section describes a prior art digital display device and discusses the inherent limitations of the device.

Digital Display Device

FIG. 1a illustrates a prior art device (e.g. the Sony PHD A55 CyberFrame™) capable of displaying digital images. However, there are several problems associated with this device. For example, the device lacks the ability to dynamically obtain image data from a networked data source and then display that data according to criteria established by an authorized user. The device shown in FIG. 1a consists of a display 100. Display 100 is an active matrix LCD screen configured to display digital video data and still image data. The data shown on display 100 is obtained from storage media 103. Storage media 103 is a memory medium capable of storing video and/or image data (e.g. a Memory Stick™).

The device contains software and/or hardware configured to playback MPEG or JPEG data files obtained from storage media 103. The device supports playback in a variety of different resolutions and can, for example, display JPEG data in UXGA (1600×1200), SXGA (1280×960), XGA (1024×768), or VGA (640×480). MPEG data files are shown on display 100 using a presentation mode that supports a resolution of 320×240 or a video mode that uses a resolution of 160×112.

The device also has built-in speaker(s) 105 and volume control 107. Speakers 105 provide a way to play back sound data introduced to the device via storage media 103. Volume control 107 allows the user of the device to adjust the decibel level. Control mechanism 109 contains the software and/or hardware utilized to control how data is displayed. For example, control mechanism 109 has a slide show mode that allows the user to display several images at varying intervals. Control mechanism 109 also provides the system with a way to delete unwanted images or keep certain images from being deleted. Control mechanism 109 is configured to provide other functionality, such as a sleep timer, brightness control, an index mode, an automatic angle detector, and a touchless sensor.

A problem with prior art mechanisms, such as the one illustrated in FIG. 1a, is that the user must physically provide storage media 103 to the device. Thus, a person who does not have physical access to the device cannot introduce new images into the device. Moreover, the device cannot be controlled from a remote location. For example, making changes to a web site cannot control the behavior of the control mechanism.

A further problem is that the functions offered by control mechanism 109 cannot be remotely updated, modified, or otherwise changed. For example, a new feature, such as the ability to obtain new images from a network, cannot be added by transmitting a software update to the device from a remote source. The device illustrated in FIG. 1a is isolated from other devices and therefore does not have the ability to communicate with such devices over a telecommunication medium.

Another limitation inherent in the design of the prior art device is that the device cannot automatically receive different types of image data. For example, the device cannot obtain different types of image data via an image delivery service. The user of the device illustrated in FIG. 1a cannot elect to periodically receive information relating to a particular topic such as the weather report. Computer networks are a prior art mechanism used to propagate data to devices connected to the network. The following section describes several techniques used to send and receive data across such computer networks and explains the limitations and disadvantages associated with such techniques.

Computer Networks

A network is an amalgamation of interconnected computers. Devices properly connected to the network may utilize the network to communicate with other devices coupled to the network. A server computer, for example, may use a network to transmit data to a client computer for display. There are several different techniques for propagating data to devices connected to the network. For example, electronic mail, client pull, and server push mechanisms all are examples of techniques that provide a way to transmit data to a client computer. However, these techniques lack a mechanism for establishing and then controlling the behavior of a device from a remote location. For example, these techniques cannot dynamically obtain image data from a networked data source and then display that data according to the behavior criteria established by an authorized user.

A. Electronic Mail Systems:

The following section discusses electronic mail systems and points out the limitations associated with using such systems to distribute image data. An electronic mail system is an example of a prior art system used to distribute data to one or more recipients. The electronic mail system, for example, provides users with a way to transmit data from one computer to another computer.

An example of an electronic mail system is shown in FIG. 1b. The system consists of one or more client computers 125–128 each having a client software program 129–132 configured to send and receive data, a network 133 configured to relay the data to one or more recipients, and a mail server 120 having server software 121 configured to store the data until it is retrieved by the designated recipient(s).

A user residing at client computer 125, for example, may use the system shown in FIG. 1b to transmit an image file to another user residing at a different computer (e.g. client, computer. 127). To send the file the user typically executes the appropriate client software program (e.g. client software 129), determines the data to be sent, and directs the program to send the data to a recipient. Data that is sent is routed across network 133 to the appropriate mail server 120–123 associated with the recipient. Once mail server 120 receives the data, the server holds the data in the intended recipients account until requested by the recipient. For example, mail server 120 will store the data until the recipient residing at client computer, 127 executes a local version of client software program 129 and directs the program to obtain data from mail server 120.

A problem associated with using current electronic mail systems is that to receive and view images recipients must have physical access to a client computer containing a client software program configured to obtain mail data. For example, an electronic mail client (e.g. Microsoft Outlook Express) and/or a web browser (e.g. Microsoft Internet Explorer) must reside on client computer 127 in order for it to obtain data from server 120.

An additional problem with using current electronic mail systems is that in order to receive data the recipient must know how to navigate around the operating system and how to use the program utilized to obtain the data. For example, in some instances the recipient is required to manually configure the program utilized to obtain data. This requires that the recipient know the name and/or address of server 120 and be familiar with the settings required to login to server 120. Current electronic mail systems cannot, for example, automatically connect to an image source, obtain image data for display, and then automatically display the image data according to a set of predetermined preferences.

Instead, current systems require the recipient to manually perform a series of steps before the image data may be viewed. For example, receivers that use a Simple Mail Transfer Protocol (SMTP)/POP electronic mail system, are typically required to 1) open a client program configured to connect to the appropriate server, 2) direct the client to obtain the image data from the server, 3) select the electronic mail message containing the image data from a list of received messages, and 4) provide the image data to a client program configured to display the image data.

In some instances, however, the receiver cannot use the electronic mail client to view the image data, but instead must have an application specially configured to view the image data. If, for example, the receiver's electronic mail client cannot process images sent in the Tagged Image File Format (TIFF), the receiver must have an application capable of viewing TIFF files in order to view the image data transmitted by the sender. Thus, a problem with using current electronic mail clients to transmit image data is that such clients lack flexibility and require the user to manually open the electronic mail message to view the attached image data.

Another problem is that electronic mail client programs cannot obtain image data and then display a full sized view of that data without requiring the user to manually intervene. Current electronic mail clients are not configured to periodically obtain and then automatically display images. Additionally, the receiver cannot control which images may be displayed and the frequency with which those images are displayed cannot be set based on the receiver's preferences. For example, mail clients lack the ability to automatically distribute data to a client computer according to a set of preferences determined by the user of the client computer. Furthermore, the receiver cannot set the behavior characteristics of the electronic mail client unless physically present at the client.

B. Client Pull:

The following section discusses the client pull technique and points out the limitations associated with using such systems to distribute image data. Client pull is an example of a technique used to download data from a server computer. When client pull is employed, data is requested by a client computer and then delivered by a server. For example, if web browser 131, executing at client computer 127, requests web page 151 stored on web server 150, it will cause web server 150 to execute web server software 152 which will in turn transmit web page 151 to client computer 127. The World Wide Web (WWW) is an example of a system that utilizes the client pull technique. The WWW is a segment of the Internet that utilizes an application layer protocol called the HyperText Transfer Protocol (HTTP) to disseminate and to obtain information from server computers (e.g. web server 150).

HTTP is a request/response protocol used with distributed, collaborative, hypermedia information systems. In operation, HTTP enables one computer to request data from another. For example, client 127 can use HTTP to communicate with web server 150 via network 133. In this scenario web server 150 acts as a data store for one or more web pages 151 and is capable of processing client 127's requests for such files. The web pages 151 stored on web server 150 may contain any type of data. For example, the files may contain data used to construct a form, image data, text data, or any other type of data. HTTP has communication methods that utilize the client pull technique to allow client 127 to request data from web server 150. Client 127 may use web browser 131 to initiate a request and thereby obtain web page 151.

Typically, web browser 131 requests at least one web page 151 from web server 150 and web server software 151 responds to the request by forwarding requested web page 151 to client 127. Once web page 151 arrives the connection is between client 127 and web server 150 is terminated. Client 127 uses web browser 131 to display requested web page 151. Web server 150 does not maintain any state information about the request once the connection is terminated. HTTP, which is frequently used to implement client pull, is, therefore, a stateless application protocol. That is, client 127 can send several requests to web server 150, but each individual request is treated independent of any other request. Web server 150 has no recollection of any previous request. Thus, for example, if a form is completed by the user and submitted to web server 150 for processing, the web server does not maintain a record of the data entered the form.

Once a file is sent from web server 150 to client 127 it becomes ready for display. Client 127's web browser 131 is typically used to format and display web page 151. Web browser 131 allows the user to request and view web page 131 (or any other web page) without having to learn a complicated command syntax. Examples of several widely used web browsers include Netscape Navigator, Internet Explorer, and Opera. Some web browsers can display several different types of files. For example, web browser 131 may display files (e.g. web pages) written using the HyperText Markup Language (HTML), the JavaScript programming language, the ActiveX programming language, or the Portable Document Format (PDF). It is also possible to display various other types of files using language such as Standard Generalized Markup Language (SGML) or extensible Markup Language (XML).

A problem with utilizing client pull to distribute data, is that information about what data is to be disseminated to the client computer must be contained in the initial request. For example, if amuser residing at client 127 wishes to request web page 131, the user may do so by entering a Uniform Resource Locator (URL) and then transmitting the URL to web server 150. The URL is used to identify the name and location of web page 131 (e.g. web page 131 resides on web server 150). When web server 150 receives the request it transmits requested web page 131 to client 127. Web server 150 is not configured, for example, to transmit data that web server 150 determines client 127 needs (e.g. onboard software updates).

Another problem associated with client pull is that it does not provide a way to ensure data is displayed only to an intended recipient (e.g. a particular device and/or a particular user). Web server 150, for example, does not provide a way to ensure that data intended for display at a certain device is only sent to that device (e.g. a device with a unique serial number). An additional problem is that client 127 cannot be directed to request data without input or direction from a user residing at client 127. For example, a user residing at client 128 cannot control the behavior of client 127. Systems utilizing client pull do not have a mechanism for control the request patterns of multiple devices.

C. Server Push:

The following section discusses the server push techniques and points out the limitations associated with using such systems to distribute image data. Server push is a technique that provides a way to transmit a predetermined data set from a server computer to one or more client computers. Referring now to FIG. 1c, a system configured to perform one or more server push operations is shown. The system is generally composed of a server system 170, a network 173, and client computers 175–171. Each element of the system is configured to perform a task. Server system 170, for example, transmits data to any client computer 175–171 scheduled to receive data. Network 173 provides end-to-end connectivity for the system and thereby links server system 170 with client computers 175–171.

Each client computer 175–171 contains software configured to provide the user with an interface for operating the computer (e.g. an operating system). A web browser 180, residing at each client, provides users with a way to inform server 170 what type of data to send and how often data of that type should be sent. For example, if the user of client computer 175 wishes to have server 170 transmit stock market quotes (e.g. data 172) to client computer 175 on a daily basis, the user may direct server 170 to do'so by obtaining a web form 190 from server 170 that provides such a option, filling the form out, and submitting the form to server 170. When server 120 receives the data provided by the user, it schedules the stock market quotes for dissemination at the interval specified by the user.

Server 120 may also be configured to disseminate electronic mail messages to client computers 125–131 on a regular basis. For example, if the user of client computer 129, or any other person authorized to control the behavior of server 120, directs server 120 to transmit an electronic mail messages to client computer 129 once a week, server 120 will distribute an electronic mail message to client computer 129 at the interval specified by, the user.

Other types of data, such as document written using the HyperText Markup Language (HTML) may also be transmitted to client computers 175–171 for display. Such document may, for example, be embedded into the graphical user interface (e.g. the GCU desktop) or shown as screen savers. Examples, of such distribution systems include the active desktop included with Internet Explorer and the screen saver distribution scheme used by pointcast.

A problem with server push systems is that data is transmitted in a unidirectional manner. For example, data may be sent from server 170 to client computer 177 using server push techniques, but data cannot be transmitted from client computer 175 to client computer 177. Another problem associated with server push is that it does not provide a way to ensure data is displayed only to an intended recipient (e.g. a particular device and/or a particular user). Web server 170, for example, does not contain a mechanism for ensuring that data is only sent to devices having a certain serial number.

None of the prior art devices and/or systems described provide a way to distribute image data to a customizable frame devices. The prior art lacks a mechanism for remotely customizing the behavior of each frame device and does not have a distribution scheme configured to distribute image data to each frame device.

SUMMARY OF THE INVENTION

A method and apparatus for distributing picture mail to a frame device community is described. The present invention comprises one or more interconnected frame devices. A frame device is a self-configuring digital picture frame that obtains images for display from a repository of that may be accessed via an interconnection fabric (e.g. a computer network). If a person (referred to as a user) wants to display an image on the frame device the person may do so by transmitting the image data to the repository.

The frame device is programmed to connect to the repository and obtain new images for display. Once the frame device is connected to the network it may also use the opportunity to update the device's onboard software. In one or more embodiments of the invention, the frame device is configured to automatically execute the steps typically required for it to connect to the repository. Thus, the frame device is self-aware and requires only a minimal amount of input from the user. Once the frame device is connected to a power source and a telephone line, for example, the device is configured to automatically access the data repository without any further user input. The software that provides the frame device with its operational logic may be automatically upgraded without input from the user. For example, when the frame device connects to the data repository the device may elect to update and/or modify the operating system software located inside the frame device. Thus, if certain information necessary for normal day-to-day operation is lost (e.g. by a power outage), the frame device may recover without requiring input from the user.

The type of images and the frequency with which such images are displayed is configured remotely via a graphic user interface called a picture box. In one or more embodiments of the invention, the picture box is accessible via a web browser. The picture box provides a way to customize the behavior characteristics of the frame device to conform to the wishes of the user. Each frame device has a display region (e.g. an LCD) surrounded by a border region modeled to resemble a traditional picture frame. The border region may be comprised of wood, plastic, or any other aesthetically pleasing compound. The border region may be, for example, an actual picture frame with a paper matte board that surrounds a thin LCD display region. Each frame device is configured to connect to an interconnection fabric to periodically obtain image data from a data repository and to then display that data according to criteria established by an authorized user.

The data repository is populated with image data via an image collection process. For example, in one or more embodiments of the invention, a networked data source (e.g. a client and/or server computer) populates the data repository with image data by submitting image data to a picture mail address associated with the target frame device. The user may specify filter criteria which establishes what network addresses (e.g. picture mail address) are authorized to populate the data repository. The filter criteria and other information such as the behavior characteristics of each frame device are established via a picture box.

When a user initializes a frame device, the user associated with the initialized frame device becomes a member of an online community. When the user initiates the frame device a picture box is created that allows the user to specify mange the behavior of the user's frame device. Each picture box is assigned a unique username (e.g. a picture address) and associated with one or more frame devices. The picture box provides the user with an interface for managing the behavior characteristics and filter criteria of one or more registered frame devices. For example, the picture box provides the user with a way to specify when the frame device should connect to the data repository to obtain a image and/or software update. When an update occurs new image data and or information related to the operation and behavior of the frame device may be transmitted to the device.

In one or more embodiments of the invention, users may obtain a picture box by using a picture box viewer (e.g. a web browser). A picture box engine residing on a server system may generate the picture box. The picture box engine uses information stored in the data repository to generate the picture box that is displayed by the picture box viewer. For example, a user residing at a client computer may use a picture box viewer to request a picture box from a server computer. The server will respond to the request by executing the picture box engine, which in turn obtains the data used to generate a picture box from the data repository.

DETAILED DESCRIPTION

Figure 1A:
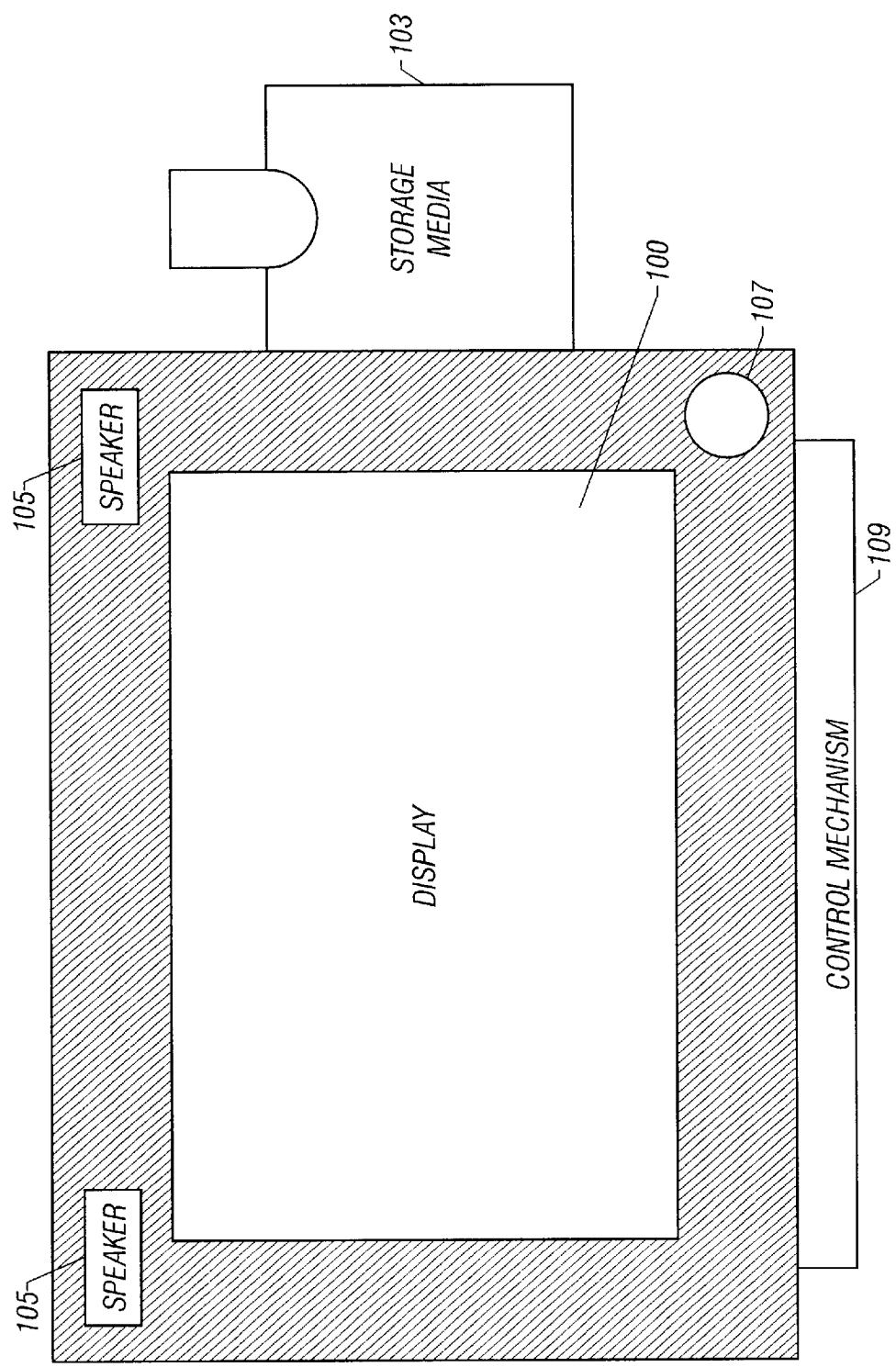
FIG. 1a illustrates a device configured to display digital images.
Figure 1B:
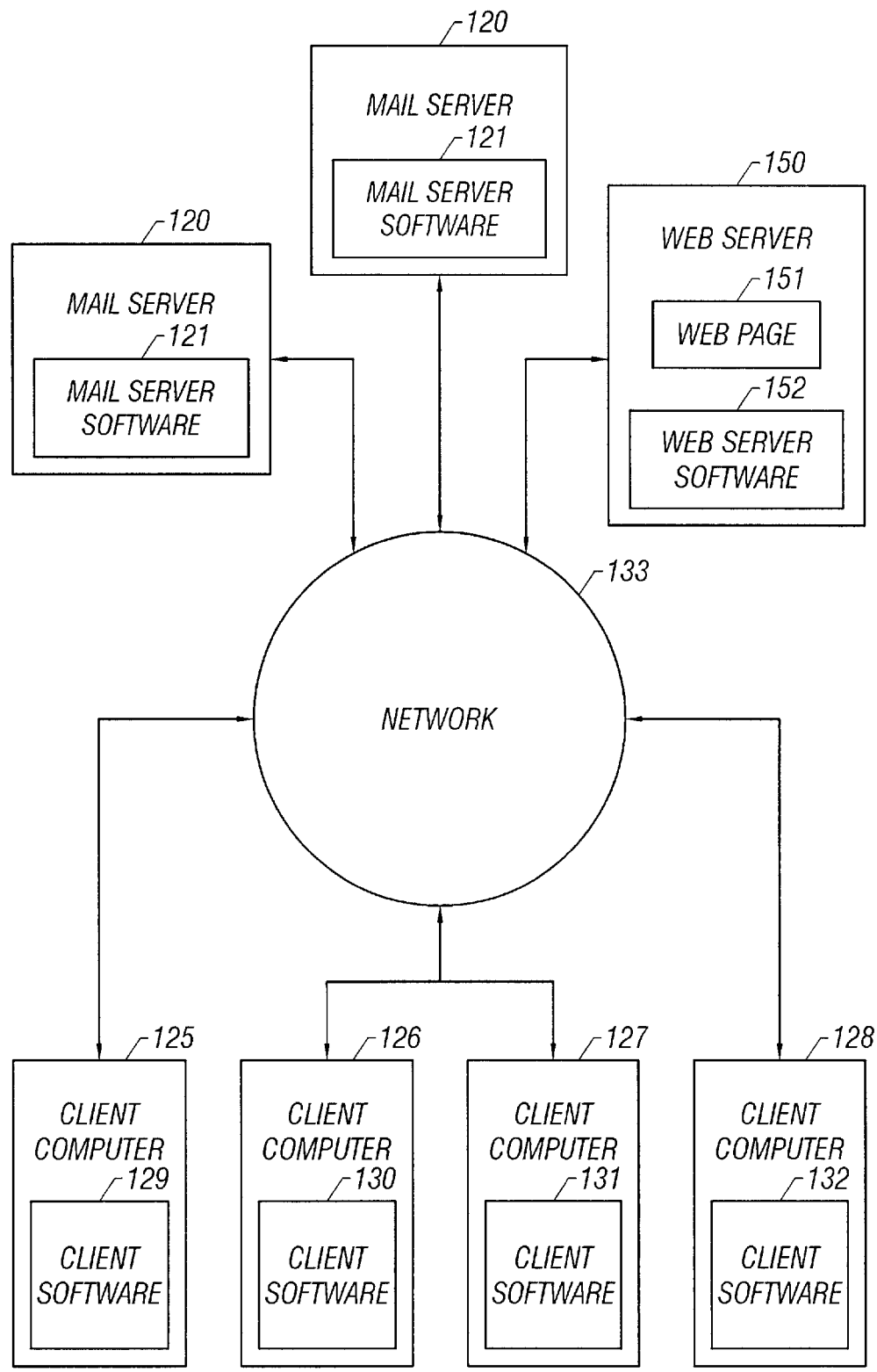
FIG. 1b illustrates the components used by an electronic mail system and/or a client pull system such as the World Wide Web.
Figure 1C:
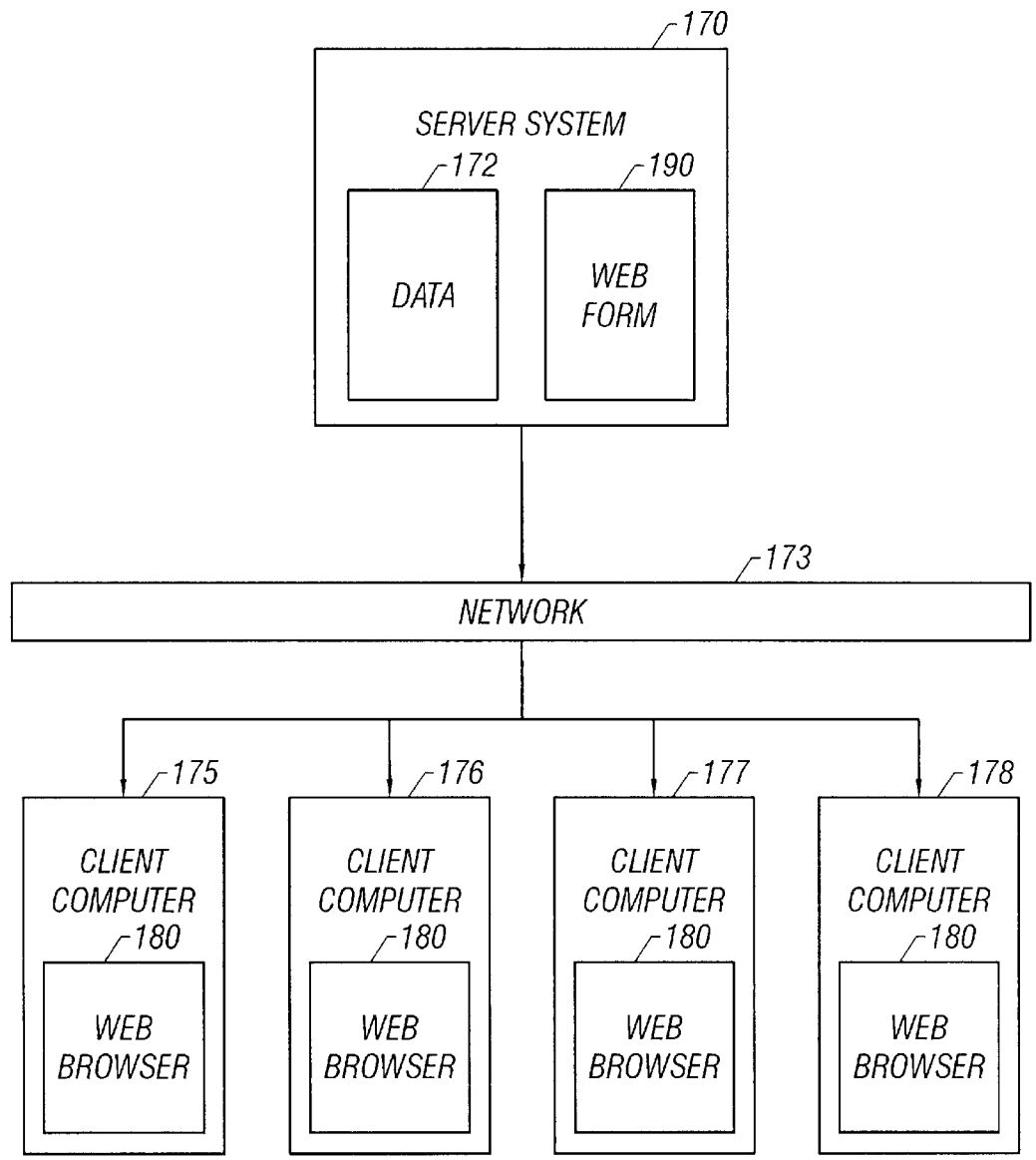
FIG. 1c illustrates a system configured to push data from a server computer to one or more client computers.

A method and apparatus for distributing picture mail to a frame device community is described. In the following description numerous specific details are set forth in order to provide a more thorough understanding of the present invention. It will be apparent, however, to one skilled in the art, that the present invention may be practiced without these specific details. In other instances, well-known features have not been described in detail so as not to obscure the invention.

General Overview

The present invention comprises one or more interconnected frame devices. A frame device is a self-configuring digital picture frame that obtains images for display and/or software from a data repository via an interconnection fabric (e.g. a computer network). Each frame device is configured to automatically interface with the data repository to obtain image data and to then display that data according to a set of preferences. For example, a frame device may dynamically obtain image data from a networked data source (e.g. a client computer), store that data, and then display that data according to criteria established by an authorized user.

Each frame device provides users with a simplified interface that minimizes the amount of complexity presented to the user without limiting the ability of the device to perform an advanced set of functions. For example, each frame device is programmed to automatically configure itself without obtaining input from the user. So long as the frame device is connected to a power source and a communication source it may remain operational without obtaining input from the user. The software that controls the behavior of each frame device may also be updated or modified without requiring additional input from the user. One embodiment of the invention provides a simplified pushbutton interface that provides users with a mechanism for manually directing the behavior of the device. However, the device will continue to operate even if users do not direct it to via the pushbutton interface. Each frame device is part of a community of interrelated components that operate in concert to provide image data to a family of one or more frame devices. The details of the system are further described below.

Image data is typically stored in a data repository (e.g. a database). Users or people authorized to submit images may transmit image data to the data repository which in turn provides the image data to an associated frame device by sending the image data via picture mail. A picture box, which comprises functionality further described below, provides users with a mechanism for controlling the behavior characteristics of each frame device. Thus, users may control the picture box without touching the pushbutton interface on the device. When the picture box is created the user associated with the picture box becomes a member of a picture mail community. Members of the picture mail community are each provided with one or more picture mail addresses.

Each frame device contains onboard software designed to automatically connect to an image delivery service. The image delivery service provides a mechanism for transmitting certain types of images to a frame device based on a set of predefined criteria. The specific aspects of the image delivery service are further described below. When a frame device is connected to a network it may automatically execute an initialization process without obtaining any additional input from the user. In one embodiment of the invention this is referred to as the self-configuration protocol. The initialization process is further described below. The data repository may act as an image relay mechanism that processes any image data that is submitted to the system via an image collection/submission engine. The functionality provided by the image collection/submission engine is discussed further below. Once the image data is processed by the collection/submission engine the data repository stores the image data until the frame. device connects to the repository for an update. Each frame device is designed to connect to a data source such as the data repository to obtain an update (e.g. image data or software data) using a conversation/security protocol.

Automatic Configuration Without User Input

The device is configured to automatically execute the steps required to connect to the repository and does not require input from the user to obtain new images and/or update the onboard software. In one or more embodiments of the invention, for example, the frame begins to acquire configuration information by obtaining the toll free phone number stored in the devices' memory and using that number to connect to a server computer. The server responds by analyzing the caller ID information contained in the connection signal (e.g. ANI) to determine what local phone number or phone numbers the frame device should utilize to inexpensively connect to the data repository. Based on the location of the frame device during dial-in, the server computer provides the frame device with information that directs the device when and where it should dial. The caller ID information, for example, provides the frame device with a way to discern what geographic region the device is located in and based on that information the device knows when to connect to the data repository for an image and/or software update. If the server determines the frame device is in located in Los Angeles, Calif. the server may inform the device to connect at 12:00 am Pacific Daylight Time (PDT) using a phone number located in the Los Angeles area. The local phone number information may be referred to as a localized number sequence.

The frame device responds by storing the information provided by the server in memory and then disconnecting from the toll free phone number without requiring any input from the user. Once the device is disconnected from toll free phone number the frame redials using one of the local phone numbers obtained while the device was connected to the toll free phone number. The local phone number provides the frame device with a mechanism for connecting to the data repository to obtain new images and/or software updates. The frame device typically uses the local phone number information to connect to the data repository at the time specified by the server without requiring any input from the user of the device. Thus, the frame device is self-configuring and self-maintained. If certain information necessary for normal day-to-day operation is lost (e.g. by a power outage or by the user physically moving the frame device), the frame device may recover without requiring input from the user.

Self-Upgrading Without User Input

The software that provides the frame device with its operational logic may be automatically updated and/or upgraded without input from the user. For example, when the frame device connects to the data repository the device may elect to update and/or modify the operating system software located inside the frame device. The functionality of the pushbutton switch or behavior characteristics of the frame device, for example, may be altered by updating the onboard software that controls the device. Transmitting an update to the frame device may modify any characteristic that may be controlled via onboard software.

Simplified User Interface

Users are not required to perform any complex activities to configure the device. The device may, however, connect to the data repository when manually directed to by the user. The frame device contains a simplistic pushbutton interface that provides novice users with a mechanism for directing the behavior of the device. For example, one or more pushbuttons provides users with a way to manually initiate a connection to the data repository. Other functions such as dimming the LCD or cycling through a set of available images (e.g. slide show mode) may also be provided by the pushbutton interface. A detailed discussion of the pushbutton interface located on the frame device follows below.

The Components of a Frame Device

Figure 3:
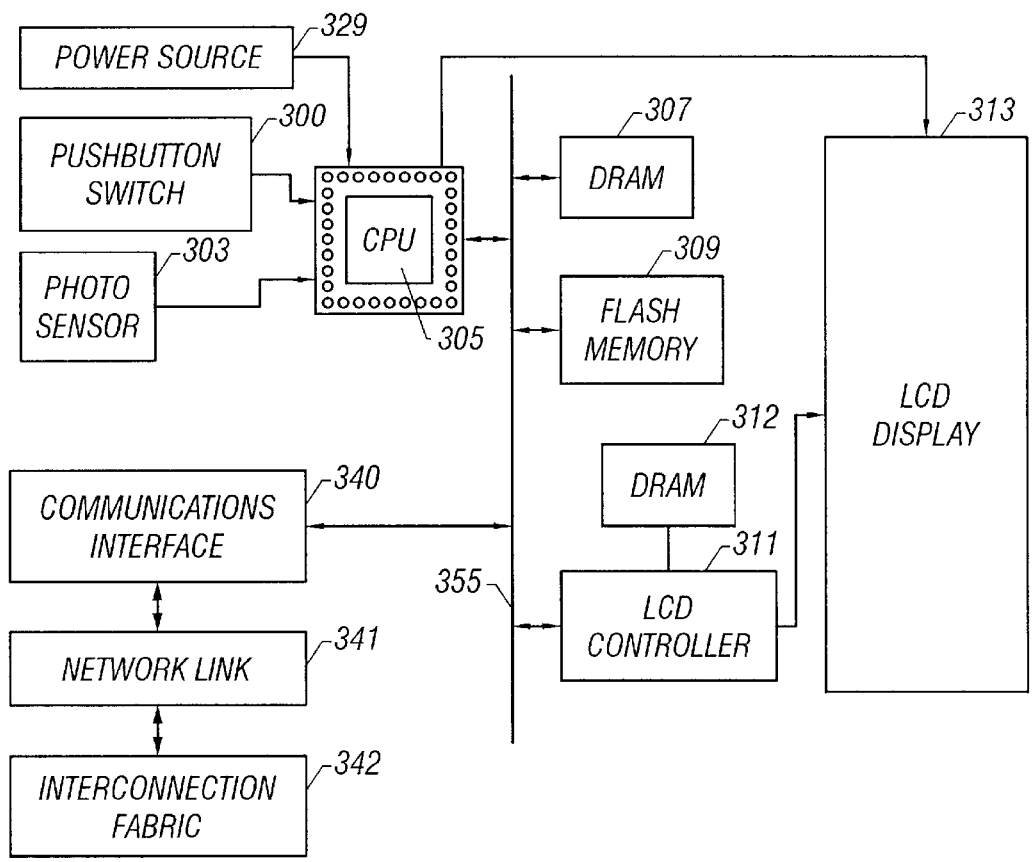
FIG. 3 is a block diagram that illustrates the internal components of the frame device.

FIG. 3 shows a block diagram illustrating the components of a frame device as it is used by one embodiment of the invention. Each frame device comprises a Central Processing Unit (CPU 305), memory (e.g. flash memory and DRAM), and telecommunication hardware and/or software configured to provide the device with a mechanism for connecting to a data repository. Onboard software stored in memory provides each frame devices with a set of behavior characteristics that may be customized by the user, or by any other person authorized to alter the frame device's behavior characteristics. CPU 305 is responsible for executing tasks for the frame device. In one or more embodiments of the invention, CPU 305 is a microprocessor manufactured by Cirrus Logic, such as the EP7211 ARM processor, or a microprocessor manufactured by Intel, such as the 80×86, or Pentium processor. However, any other suitable CPU, microprocessor, or microcomputer may be utilized.

CPU 305 communicates with the other components of the frame device utilizing system bus 335. Bus 335 may contain, for example, thirty-two address lines for addressing flash memory 309 or DRAM 307. The system bus 335 may also include, for example, a 64-bit or 32-bit data bus for transferring data between and among the components, such as CPU 305, flash memory 309, DRAM 312, and,DRAM 307. Alternatively, multiplex data/address lines may be used instead of separate data and address lines.

Display 313 represents the display hardware used to render a visual representation of the image data. In one or more embodiments of the invention, display 313 is a Liquid Crystal Display (LCD). However, the invention also anticipates the use of other display mechanisms that are capable of rendering an image for display. Flat panel technologies such as plasma displays, Field Emission Displays (FED), or improved Cathode Ray Tube (CRT) monitors, for example, may also be utilized to display images. Display 313 is surrounded with a border region modeled to resemble a traditional picture frame. Display 313 is a low profile LCD designed to minimize the prevalence of display 313. Thus, the emphasis is on the picture frame rather than the LCD. Controller 311 controls the image data output to display 313. For example, if LCD hardware it utilized to display image data, controller 311 is an LCD controller. DRAM 312 is the memory controller 311 uses to prepare image data for display on display 313. DRAM 312, for example, may be utilized for purposes of frame buffering. Dithering may be performed on the frame device in order to improve the quality of images displayed on display 313.

Flash memory 309 provides the frame device with storage space for the image data. For example, image data held in the data repository may be copied into flash memory 309 when a connection to the data repository occurs. In one or more embodiments of the invention, the image data held in flash memory. 309 is stored in a compressed format and decompressed when the data is output to display 313. Flash memory 309 may hold the onboard software that defines the functionality of the device. The mechanism and data used to control the behavior characteristics of the frame device is also stored in flash memory 309. For example, flash memory 309 may hold the local phone number utilized to connect to the data repository. In case the local phone number cannot be reached a toll-free phone number also resides in flash memory 309. The toll-free phone number may be used if the local number fails. Other information that is required to initiate a communication session with the data repository may also reside in flash memory 309.

Flash memory. 309 may store timing information. For example, the time the frame device is scheduled to dim display 313, the time the frame device is scheduled to connect to the data repository for an update, and the current time are stored in flash memory. In one or more embodiments of the invention, relative time is utilized to indicate the current time. Relative time is kept by keeping track of the number of clock cycles performed by CPU 305. However, the invention contemplates the use of other mechanisms for keeping time. For example, the current time may be obtained from a central source located on the frame device. The current time may also be obtained by accessing other networked devices such as a server computer containing a system clock.

In one or more embodiments of the invention, flash memory 309 is configured to store the software release number and/or version number of the onboard software. When a connection to the data repository occurs the version of software held resident in flash memory 309 is compared to the version held in the repository. If the version of software held in flash memory 309 is older than the version in the data repository then a newer version is loaded into flash memory 309. Thus, the frame device is configured to automatically update its software without requiring input from the user. DRAM 307 provides the frame device with an execution space for general-purpose tasks (e.g. frame buffering). Modulator demodulator 319, for example, may utilize DRAM 309 as a place to process downloaded data.

The function of pushbutton switch 300 is to provide the user with an interface for controlling certain attributes of the frame device. If, for example, the user depresses pushbutton switch 300 the frame device will illuminate display 313 so that images shown on the display become visible. Pushbutton switch 300 is also used as a frame advance. Thus, pushbutton switch 300 provides the user with a way to navigate through the images held in flash memory 309. If ten images currently reside in flash memory 309, the user may utilize pushbutton switch 300 to cycle through the ten images in flash memory 309 available for display. One embodiment of the present invention contemplates using pushbutton switch 300 to force the frame device to update its image library. For example, depressing pushbutton switch 300 for an extended duration of time (e.g. several seconds) causes the device to initiate a connection to the data repository. Once the connection is established the frame device utilizes the information contained in the data repository to supply the frame device With a new set of images. Pushbutton switch 300 also provides a way for the user to alter the backlight level of display 313. In one embodiment of the present invention, pushbutton switch 300 is configured to alter any of the attributes of the frame device provided via software. Thus,it is possible to periodically change the features controlled by pushbutton switch 300 to meet the demands o the user.

The invention also contemplates the use of multiple pushbutton switch 300's. If multiple pushbutton switch 300's are present each pushbutton switch 300 may be configured to perform different functions. For example, one pushbutton switch 300 may be utilized as a dimmer button that controls the brightness of the frame, whereas the second pushbutton switch may be configured to act as a main button that has multiple functions. In one or more embodiments of the invention, the pushbutton switch provides a mechanism for marking images for deletion. The pushbutton switch may also be utilized to identify images that are to be saved or archived. Photo sensor 303 supplies the frame device with a mechanism for automatically dimming display 313 when certain conditions, such as the passage of time or the activation of pushbutton switch 300, occur. The frame device is operational without photo sensor 303. Therefore, photo sensor 303 is not required, but may be included if dimming functionality is desired.

Communication interface 340 provides a two-way data communication coupling via a network link 341 to interconnection fabric 342. Communication interface 340 may be implemented in software or hardware form. In one or more embodiments of the invention, data communication interface provides a codec for optimizing data throughput to network link 341. Interconnection fabric 342 represents any type of network configured to transmit data. For example, interconnection fabric 342 may represent the Internet or any other type of easily accessible computer network.

If communication interface 340 is an integrated services digital network (ISDN) card or a modem, communication interface 340 provides a data communication connection to the corresponding type of telephone line, which comprises part of network link 341. Data is then transported across network link 341 to interconnection fabric 342. If communication interface 340 is a local area network (LAN) card, communication interface 340 utilizes a compatible LAN as network link 341 to transmit data to interconnection fabric 342. Wireless links are also possible. In any such implementation, communication interface 340 sends and receives electrical, electromagnetic or optical signals that carry digital data streams representing various types of information. These signals are transmitted across network link 341 to interconnection fabric 342. Therefore, interconnection fabric 342 couples the frame device to the data repository.

Power source 329 provides the frame device with the electrical current necessary to properly run the device. In one or more embodiments of the invention, power source 329 obtains an electrical signal from a standard wall plug and utilizes a transformer unit, a voltage converter and an econo reset device to prepare the signal for use by the frame device. Power source 329 may also obtain an electrical signal from a battery, solar power, or any other source that can generate the appropriate amount of current required to adequately power the frame device.

System of Interrelated Components

Figure 2A:
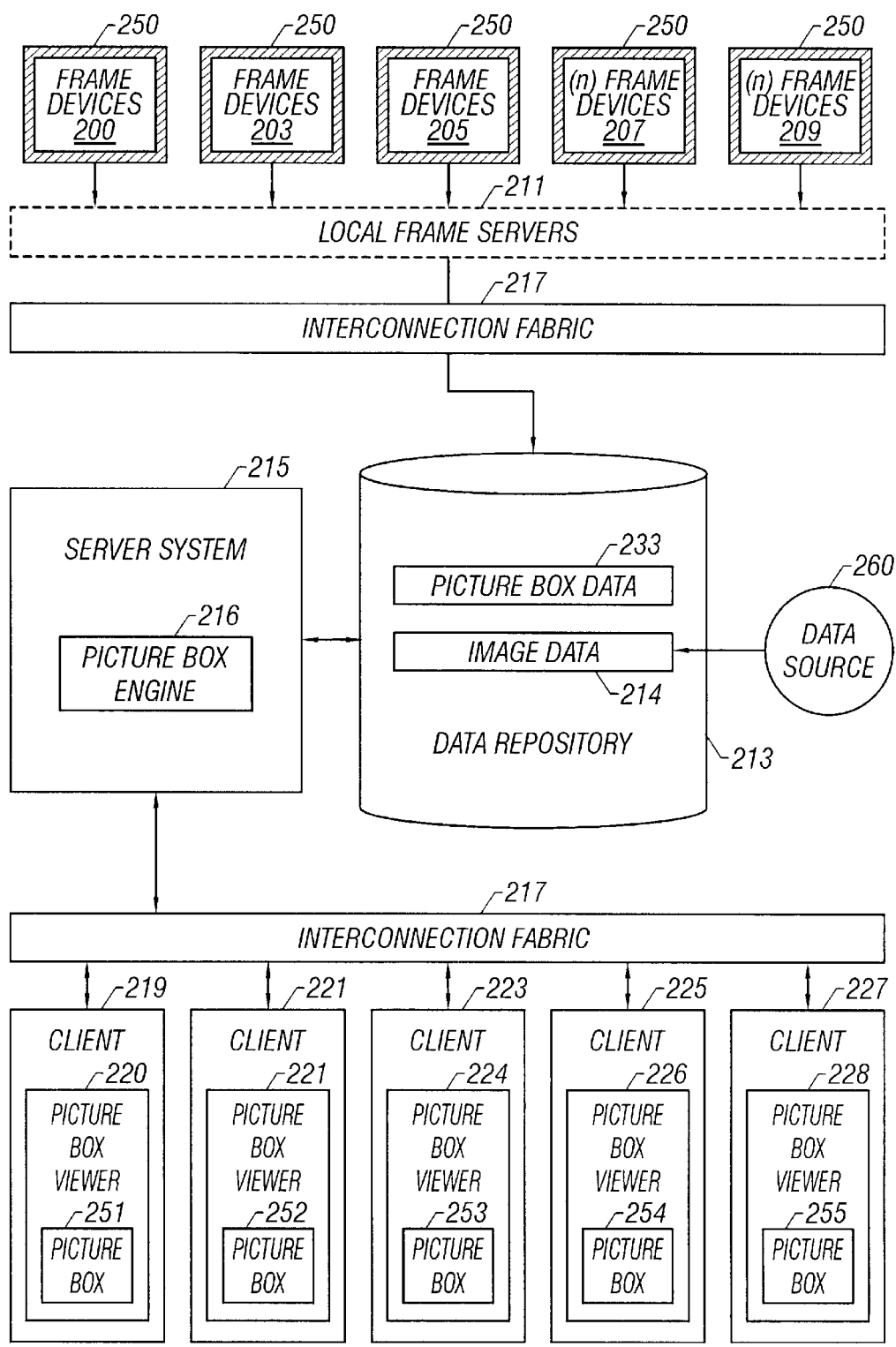
FIG. 2a is a block diagram that illustrates the components utilized by one embodiment of the invention.

FIG. 2a is a block diagram that illustrates the components comprising one embodiment of the invention. In the embodiment illustrated, the system comprises one or more frame devices 200–209 configured to connect to data repository 213 via an interconnection fabric 217. Frame devices 200–209 are designed to resemble traditional picture frames. For example, each frame device contains a border region 250 that enhances the aesthetic qualities of the device. The border region 250 may be comprised of wood, plastic, metal, or any other compound that is pleasing to the eye. Each frame device 200–209 may have a border region 250 that appears to be different from the border region 250 of another frame device. For example, the border region 250 for frame device 200 may appear different than the border region 250 attached to frame device 209. In one or more embodiments of the invention, border region 250 is an actual picture frame sized to surround the display of frame device 209. Border region 250 may contain a matte board designed to complement the picture frame.

However, unlike a traditional picture frame, the images shown in the display region of frame devices 200–209 can be periodically modified. For example, frame device 200 can be configured to show a first image for a certain duration of time and a second image for another duration of time. Image data 214, for example, can be shown in the display region once it is obtained from the data repository.

Frame devices 200–209 connect to data repository 213 to obtain image data 214 via interconnection fabric 217. In one or more embodiments of the invention, frame devices 200–209 use one or more local frame servers 211 to connect to interconnection fabric 217. An Internet Service Provider (ISP), modem pool, or any other mechanism capable of connecting frame devices 200–209 to interconnection fabric 217 is an example of a local frame server. However, local frame servers 211 are not required to achieve connectivity to interconnection fabric 217. Frame devices 200–209, for example, may connect directly to interconnection fabric 217 and thereby bypass local frame servers 211.

In the invention, interconnection fabric 217 is any of multiple suitable communication paths for carrying data between frame devices 200–209 and data repository 213. Interconnection fabric 217 may be, for example, a local area network (LAN) implemented as an Ethernet network. Any other local network may also be utilized. The invention also contemplates the use of wide area networks such as the Internet and/or World Wide Web. Interconnection fabric 217 may be implemented using a physical medium such as a wire or fiber optic cable, or it may be implemented in a wireless environment. For example, the invention contemplates the use of dedicated, dial-up, or shared communication interconnects.

The data repository is populated with image data 214 via an image collection process. Image data 214 is inserted into data repository 213 by data source 260. In one or more embodiments of the invention, data source 260 populates data repository 213 with image data by obtaining the data from a storage medium such as a hard drive, preparing the data for submission, and transmitting the data to data repository 213. A program executing at data repository 213 determines whether the image data satisfies certain filter criteria. For example, the program may determine whether the image data was transmitted from a member of the users buddy-list and/or address book. If the image data does not satisfy the filter criteria it may be discard or returned to the original data source. For example, in one or more embodiments of the invention, a networked data source (e.g. a client and/or server computer) populates the data repository with image data by submitting image data to a picture mail address associated with the targeted frame device. In one or more embodiments of the invention, the picture mail address is a network address (e.g. an IP address) that is associated with a frame device. The user may specify filter criteria (e.g. via a picture box) which establishes what addresses,(e.g. picture mail address) are authorized to populate the data repository. Users who join the picture mail community by connecting one or more frame devices to the interconnection fabric may, for example, pass images data to other members of the community via a picture mail address. However, users are not required to belong to the picture mail community to submit images to a frame device that does belong to the picture mail community. In addition to storing the image data, and filter criteria, data repository 213 also comprises data that may be used to define the behavior of frame devices 200–209. The structure and arrangement of the data repository itself will be discussed further below. In one or more embodiments of the invention, the filter criteria (e.g. who is permitted to send images to a frame device) and other information held in data repository 213 such as the behavior characteristics of each frame device are established via a picture box.

Users may use the picture box to customize the behavior characteristics associated with each frame device 200–209. Specifying the time and type of image data 214 frame device 200 is to obtain is an example of a customizable behavior characteristic. However, any feature and/or function offered by the frame devices 200–209 may become a behavior characteristic.

Each picture box 229–233 may provide a way, for example, to specify how often a certain frame device retrieves new image data from the data repository. For example, the user of client computer 225 may use picture box 232 to specify how, often frame device 207 connects to data repository 213. Picture box 232 can also be configured to provide the user of client computer 225 with a mechanism for controlling what images are deliver to frame device 207. For example, the user could specify that images should only be accepted from people listed in the user's buddy-list, friendly-sender list, or address book. If the user of client computer 225 wants to subscribe to an image delivery service, this preference may also be expressed via picture box 232. The image delivery service regularly delivers images that illustrate weather reports, art collections, greeting cards, movie posters, post cards, live camera data, or any other type of customized data to the user's frame device. Each image delivery service may be separately subscribed to and the device may be unsubscribe at any time.

The user may also utilize the picture box to define filter criteria (e.g. to specify who is authorized to populate a certain frame device with new images). For example, the user of client computer 221 may use picture box 232 to indicate that only images received from certain picture mail addresses are to be held for display in data repository 213 and forwarded to frame device 203 upon request. Each individual picture box 229–233 controls the behavior characteristics of one or more frame devices 200–209. Picture box 220, for, example, may be configured to control frame device 203 and 209.

In one or more embodiments of the invention, the picture box engine 216 is responsible for obtaining the picture box data 233 needed to generate a picture box from data repository 213 and transmitting a visual representation of the picture box to the appropriate picture box viewer. For example, a user who has permission to control frame device 209 may control the behavior characteristics of the device via a picture box. The user may obtain picture box 251 by using picture box viewer 220 to request picture box 251 from server system 215. For example, if a user residing at client computer 219 uses picture box viewer 220 to request picture box 251 from server computer 215 the server responds by executing picture box engine 216, which in turn obtains picture box data 233 from data repository 213. In this instance, picture box data 233 is associated with frame device 209. However, the picture box may be associated with any frame device 200–209 the user is authorized to control. The user may control multiple frame devices via a single picture box. A single user can also elect to use multiple picture boxes to control multiple frame devices.

It is possible for the user to modify the onboard software embedded into each frame device 200–209 by making changes to the picture box. When a change is made it is reflected in data repository 213 and communicated to the frame device when the device connects to data repository 213 for an update. Other authorized parties, such as the picture box provider, can also modify and or update the functionality provided by the onboard software by indicating to the frame device when it connects to the data repository that new software is available for it to obtain. When the frame device receives such a message it may automatically obtain and install the new software update. Thus, authorized users can automatically add new functionality and features into the frame device without prompting the user for input.

Each client computer 219–227 is configured to run a picture box viewer 220–228. For instance, client computer 219 is configured to execute picture box viewer 220. Picture box viewer 220 provides the user of client computer 219 with a visual representation of picture box 229. In one or more embodiments of the invention, picture box viewers 220–228 are web browsers configured to obtain picture box data from server system 215. Picture box engine 216 is responsible for generating picture boxes. To accomplish this task, picture box engine 216 obtains picture box data 233 used to create the picture boxes 229–233 from data repository 213. The invention contemplates placing picture box engine 216 in a variety of different locations. In one embodiment, for example, picture box engine 216 resides at server system 215. However, picture box engine 216 may also resides on any computer readily accessible to clients 219–227 via interconnection fabric 217.

Figure 2B:
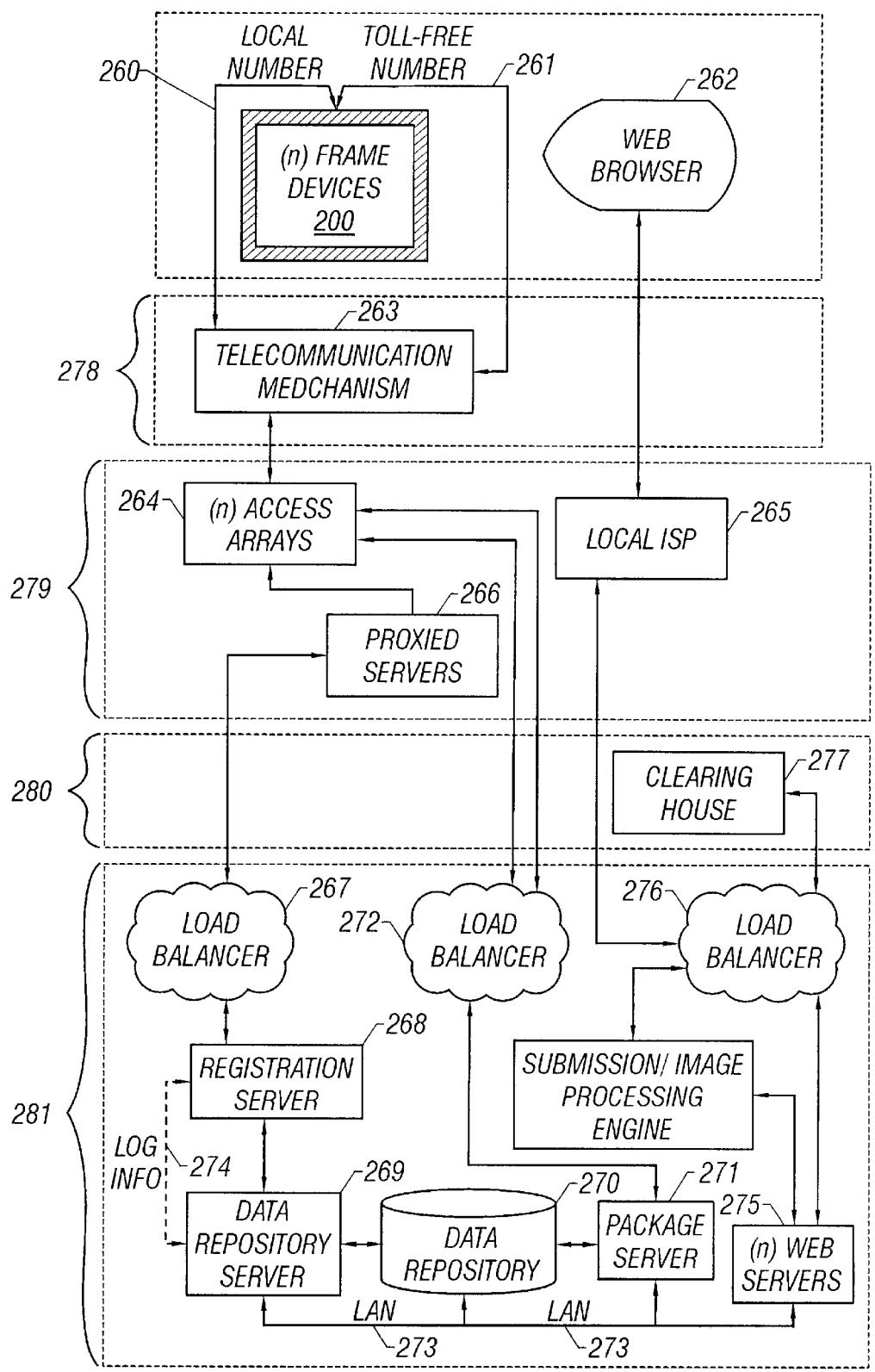
FIG. 2b illustrates the system components utilized by one or more embodiments of the invention.

FIG. 2b illustrates the system components utilized by one or more embodiments of the invention. Frame devices 200n and web browser 262 are both controlled by an authorized user 283. The term user as described herein has multiple meanings. The term comprises guest users who have not yet registered and/or initialized a frame device. The term user also refers to registered guests (e.g. members) that may submit images to a frame device. An owner is a type of user who has a frame device. However, an owner need not use web browser 262 to configure the frame device if a user of another type or the manufacturer of the device already has configured the frame. One or more embodiments of the invention contemplates the use of an owner-proxy. The owner-proxy is authorized by the owner to act on the owner's behalf. For example, the owner-proxy may be given authority to control certain aspects of the frame device by the owner. A parent is the user who controls one or more frame devices. The parent has the authority to control what type of images is displayed on the frame and who may submit images for display. The parent user typically has all the privileges needed to control the frame device. The purchaser or buyer of a frame device may also be referred to as a user. A person who provides images and/or data to the system such as a gallery provider, channel provider, and or advertisement provider is also considered a user of the system. Thus, the term user is intended to be a general term that has multiple meanings. A single person or entity may function as multiple users and multiple people may function as one or more users. The invention contemplates assigning each type of user a different password. Thus, each user may be assigned a different level of access to the system. For example, a parent user has permission to modify the picture box in any way whereas a member does not yet have permission to modify the frames behavior, but may submit images to the picture box for display on the frame device.

When a user initially connects frame device 200 to a power source and/or a communication source, the frame device interfaces with telco 278 via telecommunication mechanism 263. Telecommunication mechanism 263 connects to access array 264. In one or more embodiments of the invention telco 278 is the infrastructure provided by a telecommunications provider (e.g. AT&T, MCI, SBC, PacBell, GTE, etc . . . ) and telecommunication mechanism 278 is a local phone service and/or toll-free phone service. Access array 264 is provided by ISP 279, and comprises one or more devices configured to communicate with the carrier wave signals transmitted by frame device 200. The invention contemplates the user of multiple access arrays and each access array may be located in a different geographic region. Each access array may be configured to understand the signaling and/or communication protocols utilized by the frame device. For example, if frame device 200 uses a modem to connect to access array 264, access array 264 may be configured to understand the corresponding signaling standard (e.g. V.32, V.42bis, V.90 etc . . . ). Access array 264 may also comprise computer hardware configured to understand protocols such as TCP/IP, SLIP, and PPP. The services offered by MegaPOP™, ZipLink™, UUNE™, and/or GTE Internetworking™, for example, are examples of an access array 264.

Access Array 264 communicates with proxied server(s) 266. Proxied server 266 may be, for example a RADIUS server configured to communicate with the registration server 268. RADIUS is a program that runs on a computer. RADIUS allows the expansion of the number of user (connection) profiles available to RADIUS compliant remote access devices. The three main functions of a RADIUS server are authentication, authorization, and accounting. RADIUS is used to authenticate users for dial-in and/or remote access via a data communication network. Authentication information may be stored locally (e.g. in a local file) or accessed from external authentication mechanisms. Authorization controls access to specific services on the network. Once a user is authenticated, RADIUS identifies what a user is authorized (permitted) to access and communicates that information to a PortMaster. For example, user __1 may be authorized to use a certain type of communication protocol (e.g. PPP or SLIP) for his connection, and to use a certain IP address. The RADIUS accounting permits system administrators to track dial-in and/or network use. The present invention is not limited to the use of RADIUS servers, but also contemplates the user of other types of servers that perform the functionality required to effectively balance the communication path between frame device 200 and data repository server 269.

In one or more embodiments of the invention, access array 264, proxied server 266, load balancer 267, and registration server 268 intercept and then forward data signals transmitted from frame device 200 to data repository server 269. Load balancer 267, for example, is responsible for balancing the load placed on devices in the communication path (e.g. registration server 268). A Domain Name System (DNS), Windows load balancing service, Router, or Round Robin device are some examples of systems capable of acting as load balancer 267. Load balancer 267 is provided by frame data provider 281 to communicate with data repository server 269 via registration server 268. The functionality provided by load balancer 267,272, and 276 may be provided by a single computer or multiple computers. A single computer connected to the interconnection fabric may, for example, be configured to execute software or hardware that acts as load balancer 267. Alternatively, the functionality provided in load balancer 267 may be executed in other computer systems connected to the interconnection fabric (e.g. Registration Server 268 or Data Repository Server 269).

Data repository server 269 and registration server 268 may be configured to transmit log information 274 to one another. In one or more embodiments of the invention log information 274 is RADIUS logs. Data repository server 269 executes, manages, and communicates with data repository 270 via Local Area Network (LAN) 273. Data repository 270 is a database file system and image store. However, data repository 270 may also comprise other information needed to update and/or manage frame device 200. For example, the data contained in Package Server 271 may be stored in data repository 270.

Package Server 271 is configured to communicate with data repository 270 and data repository server 269 via LAN 273. In one or more embodiments of the, invention,package server 271 comprises a File Transfer Protocol Daemon (FTPd), a packager, and an interpreter. Package server 271 may also be referred to as an application server. The packager is responsible for generating multiple kinds of packages. A package is a compilation of data that provides the recipient and the transmitting device with information needed to complete a transaction. For example, a package may contain authentication information that provides frame device 200 with a way to verify whether package server 271 is authentic. A package may also contain metadata about frame device 200. For example, some or all of the information stored in flash memory and/or DRAM may be inserted into a metadata file. The metadata file may contain, for example, a unique frame identifier, a relative clock time, a lights on clock tick, a lights out clock tick, a connect time, connection information, slide show information, log information, name server information, image information, an image display list, and error information. Other information utilized by the frame device and/or any of the server systems may also be placed into the metadata file. The package server 271 may also generate packages that contain content and formatting data (e.g. image and/or text data).

To obtain package data frame device connects to access array 264 via telecommunication mechanism 263. In one or more embodiments of the invention frame device 200 is configured to establish an FTP session with package server 271. Once the session is established, frame device 200 transmits a unique identifier (e.g. user/frameID). Package server 271 responds by prompting frame device 200 for password information, which the frame then transmits. The frame device may dynamically generate the password information. Once frame device 200 enters the correct password, the device is permitted access to package server 271. At this-point frame device 200 is linked to package server 271 and data may be sent to and from each using either ASCII mode or binary, mode. Load Balancer 272 may be optionally placed between package server 271 and access array 264 in order to ensure that the load placed. on package server 271 does not exceed its capacity.

Frame device 200 typically communicates with package server 271 using the binary connection mode. During the communicate session frame device 200 initiates a GET command via path and thereby obtains an authentication file from package server 271. When frame device 200 obtains the authentication file, it determines if the authentication file is authentic by computing a checksum and comparing the result to an expected results file. If the comparison matches, frame device 200 "trusts" package server 271. When a trust relationship is established frame device 200 transmits package data to package server 271. In one more embodiments of the invention, frame device 200 tells package server 271 how much package data it will be sending (e.g. via a SIZE command) and then transmit that amount of data to package server 271 via a PUT command. For example, a content list and a log file may be transmitted to the server via the PUT command. Package server 271 then computes and compares the checksum information associated with the transmitted package data (e.g. metadata). Frame device 200 may also utilize the GET command to obtain additional packages. In one or more embodiments of the invention, the USER command and PASS command are modified to provide an additional layer of security. For example, the PASS command and the USER command may be modified to transmit and/or bounce back encrypted strings of data that are authenticated before access to the package data is permitted.

For example, frame device 200 may use the GET command to obtain an administrative package comprising information useful for administering the frame and/or a content package comprising content and formatting data. The content of the packages is self-defined and may vary depending upon the requirements of frame device 200. Upon delivery of the relevant packages, frame device 200 may synchronize its time keeping mechanism with package server 271 and terminate the connection. If the frame device connected using the toll-free phone number, local number information is obtained and provided to the frame device in the administrative package. The local number information that is best for the device is determined by analyzing the caller ID information provided when the device call using the toll-free phone number.

In one or more embodiments of the invention, web browser 262 provides a mechanism for submitting and/or changing the image data that is to be displayed on frame device 200. To submit image data web browser 262 connects to local ISP 265 via telco 278. Local ISP 265 communicates with load balancer 276 which in turn communicates with one or more web servers 275 and submission/image processing engine 284. Web browser 262 and web servers 275 may also communicate with clearing house 277 and/or data repository 270. Clearing house 277 is a computer system configured to process transactions with user 283. In one or more embodiments of the invention, submission/image processing image comprises software configured to obtain image data from user 283 via web browser 262.

The Data Repository

The data repository comprises one or more databases. Each database provides the system with information and/or data related to distributing data to one or more frame devices. In one or more embodiments of the invention, the data repository stores information used to control the content distributed to and from each frame. For example, data about each user and the preferences associated with that user may be held in the data repository. Each frame device is configured to connect to the data repository at one or more predefined intervals utilizing an interconnection fabric such as the Internet. Once a frame device connects to the data repository, it utilizes the information stored in the data repository to update the image data that is to be displayed and the behavior characteristics of each frame device. For example, the functions provided by the onboard software may be modified when the behavior characteristics are updated. The data repository is therefore responsible for queuing and archiving image data and/or software data for each frame device associated with the data repository.

Figure 4:
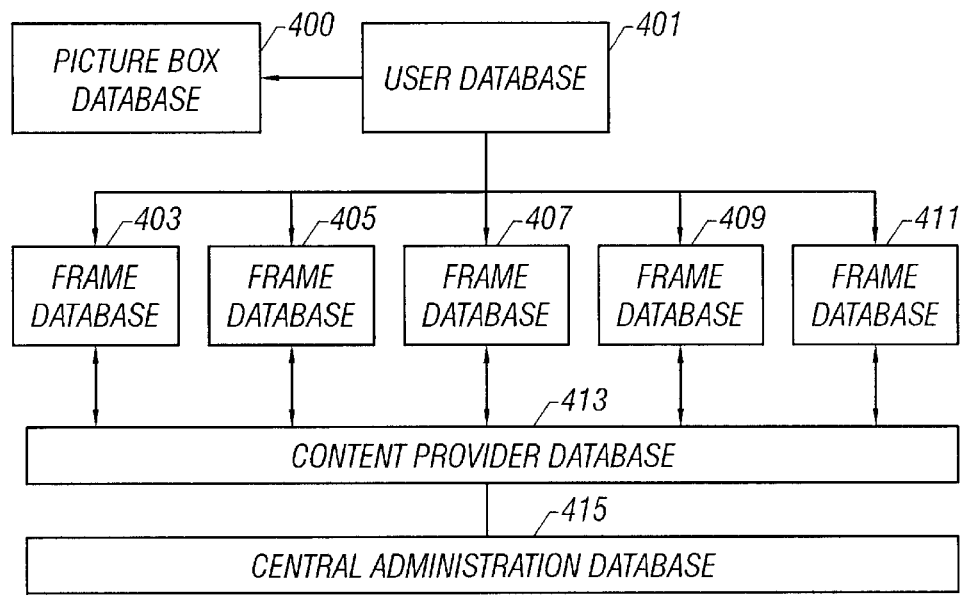
FIG. 4 illustrates what type of data may be stored in the data repository.

Referring now to FIG. 4, an example, of the type of data stored in the data repository is shown. In one or more embodiments of the invention, the data repository is comprised of multiple databases. The databases are related to one another and contain information utilized to generate the data repository. Each database may contain one or more tables of information. Thus, the data repository may be constructed as a single database having one or more tables or as a series of databases related to each other. The term database and table may therefore be used interchangeably. The databases may be organized using a relational structure, an object-oriented structure, or any other type of organizational scheme configured to store the information needed to create the data repository. The databases may also be distributed across multiple computers. For example, a first computer may contain one portion of the data repository and a second computer may contain a second portion of the data repository.

One of the databases contained in the data repository is the user database 401. User database 401 comprises information about users that have registered with the system. In one embodiment of the invention user database 401 contains one record for each registered user. User database 401 typically stores information about the user such as the user's username, password, picture mail address, and billing information. User database 401 may also contain a list of picture mail addresses from which image data may be received. If, for example, a user wishes to receive picture mail from a certain address the user may designate that address as a friendly sender by placing the address in the list of picture mail addresses from which data may be received. In one or more embodiments of the invention, picture mail addresses not contained in the list may not populate a user's frame device with image data. The user may use the picture box to identify a list of friendly picture mail addresses. This list of friendly senders may be referred to as a buddy list and/or address book.

The data repository also holds information about each frame initialized with the system. A frame becomes initialized when the user of the frame device, or a person acting on behalf of the user, directs the system to obtain a picture box. Information about the frame device is held in the frame database 403. The frame database 403 comprises multiple records 404–411n and each record is associated with a unique frame device. A single user, however, may have multiple frames registered with the system. Thus, one record in user table 401 may be related to many records in the frame table. For example, if a user owns two frame devices the data repository may have a single record about that user in user database 401 and two records about the user's frame devices in frame database 403. Frame database 403 contains a record for each frame device that registers with the system.

Frame database 403 contains information that uniquely identifies each frame. Frame database 403, for example, may store a serial number or any other form of information that uniquely describes a particular frame device. Each user, may control one or more frame devices. In one or more embodiments of the invention, frame database 403 stores information about the geographical location of each frame. For example, the zip code, the area code, and/or phone number where the physically device resides, or any other information that identifies the location of the device may be used to describe the geographic location of the frame.

In one or more embodiments of the invention, each frame is associated with an access number. The access number is the phone number utilized by a particular frame device to connect to the interconnection fabric. The access number, for example, may be a toll free phone number or the phone number of an ISP closest in proximity to the physical location of the frame device. The access number may be stored in frame database 403.

Frame database 403 also contains data that identifies the intervals at which a particular frame device may perform a predefined action. For example, frame database 403 may hold information that specifies the date and time the frame device associated with that record is to connect to the data repository. The actions performed may be defined by the user of the frame device or by an entity authorized to control the actions of the frame device. One embodiment of the invention allows any person with access to the picture box to define an action.

The intensity of each frame device's display region may be varied. For example, the display of each frame device may be configured to dim at certain times. The dimming times are stored in frame database 403. For example, if the user wishes to have a particular frame device dim between the hours of 11:00 p.m. and 6:00 a.m. this information may be specified via the picture box and is stored in frame database 403. The frame device may also be configured to automatically dim at a certain time based on the longitude and latitude of the device. The system obtains the location of the frame device when the device indicates it is present by calling the toll free phone number embedded in memory. The caller ID information passed during this connection, for example, allows the system to determine the location of the device and set the corresponding dimming times. The frame device is typically directed to dim during times when network traffic is low and connect time is inexpensive, however, dimming may occur at any time determined to be appropriate by the system. For example, dimming may occur at a time that is not associated with the geographical location of the frame device.

Information about the software contained in each frame may also be stored in frame database 403. For example, frame database 403 may store the release and/or version number of the software used to operate and control each frame. If the software is not the most current version available an indication as to whether it is ok to download the software may also be stored in frame database 403. Frame database 403 stores information about the connection history of each device. For example, the number of failed connections, the number of successful connections, as well as the speed and duration of those connections is stored as the connection history. The connection history may also contain a record of the communication sessions established by a particular device (e.g. the phone numbers called by a particular frame device and the number of images transmitted to the device at that phone number). The frame database 403 may also contain a list of the administrative information uploaded to each frame device.

In one or more embodiments of the invention, the data repository also contains content provider database 413. A content provider is an entity or organization that offers one or more image delivery services via the interconnection fabric. Content provider database 413 may contain information about multiple content providers. Content provider database 413 contains the name and location of each content provider. For example, content provider database 413 may store the web address or Internet Protocol (IP) address where data pertaining to a particular image delivery service may be located. Content provider database 413 may also contain pointers to other databases where image data utilized to offer an image delivery service resides.

The data repository also stores data utilized by multiple frame devices. For example, central administration database 415 comprises information such as the time of day (per time zone), administrative messages and/or images, broadcast messages and/or images, and other general data utilized by the frames devices when a connection to the data repository is made. An example of a relational database schema arranged to store the data utilized by the system is shown in appendix A.

The Picture Box/Picture Mail Community

When a user initializes a frame device, that frame device becomes associated with a picture box. For example, each frame device 200–209 is uniquely identified (e.g. by a serial number, address, digital signature, or other identifier) and associated with a particular picture box (e.g. an account at a web site). Each picture box is associated with a unique username and/or picture mail account. Once a picture box is obtained, the user associated with the picture box becomes a member of a picture mail community. Members of the picture mail community are each provided with one or more picture mail addresses. A picture mail address provides a mechanism for transmitting image data to a frame device. The picture mail address, for example, provides the system with the addressing information needed to identify the location of the frame and transmit image data to the frame. Thus, the picture mail address provides user with a way to pass images between others users (e.g. family and friends) who also belong to the picture mail community. In one or more embodiments of the invention, a picture mail address is a network address that uniquely identifies the location of each frame device. The picture mail address may be implemented in the form of an electronic mail address, an IP address, or any addressing scheme that informs the system how to direct image data to the frame device.

Image data may be sent to the frame device by sending the data from a data source (e.g. a client or server computer) to the picture mail address associated with that device. The picture box provides the user with an interface for managing the behavior characteristics of one or more registered frame devices. In one or more embodiments of the invention, each user is given a single picture box to control the behavior characteristics of multiple frame devices. However, a user may also be given multiple picture boxes. The picture box is accessible via an interconnection fabric such as the Internet and may be viewed using a standard web browser. In one or more embodiments of the invention, each frame device is associated with a specific picture box. Information about the picture box utilized to control a frame device may be stored in frame database 403.

Information used to generate each of the picture boxes may be stored in picture box database 400. For example, picture box database 400 contains a representation of the image (e.g. a thumbnail) as it will be displayed on the frame device, should it be flagged for download to the device. The location (e.g. picture mail address or network address) the image data was transmitted from is also stored in picture box database 400. Other information such as the date and time the image was received at the data repository and the date and time the image was received at a particular frame device also resides in picture box database 400. Picture box database 400 may also contain information about the status of the image data accessible to a particular frame device, such as whether the image is to be archived or kept on the frame device when an update occurs. Data that specifies the filename of the image, whether the image currently resides on the frame device, and routing information that specifies which images should be sent to which frame devices may also be stored in picture box database 400.

Figure 5:
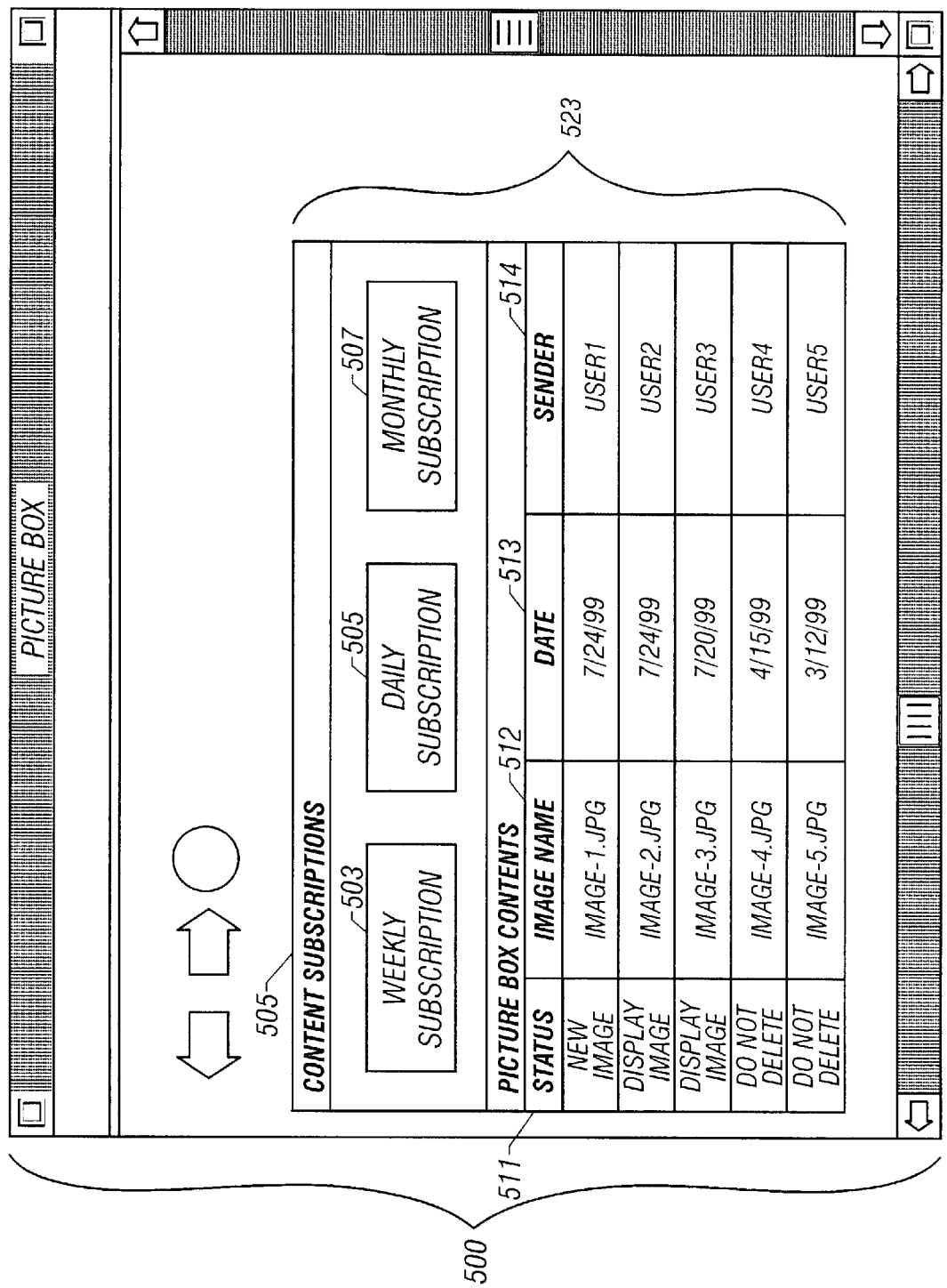
FIG. 5 is an illustration of a picture box viewer containing a picture box.

FIG. 5 shows an illustration of a picture box viewer containing a picture box. In one or more embodiments of the invention, picture box viewer 500 is a web browser configured to display picture box 523 (e.g. a web page). Examples of several widely used web browsers include Netscape Navigator, Internet Explorer, and Opera. However, picture box viewer 500 may be any type of software program configured to display picture box 523. Picture box 523 is any type of data file cable of being transmitted to picture box viewer 523 for display. For example, files written using the HyperText Markup Language (HTML), the JavaScript programming language, the ActiveX programming language, or the Portable Document Format (PDF) may be displayed using. picture box viewer 523. It is also possible to generate picture box 523 using various other types of languages such as Standard Generalized Markup Language, (SGML) or extensible Markup Language (XML).

Picture box 523 is any example of the type of interface that may be used to create and/or modify records in the data repository. The information stored in the data repository may be presented to the user via picture box 523. In one or more embodiments of the invention, picture box 523 comprises a first portion 505 that contains a list of the image delivery services scheduled to provide data to a particular frame device and a second portion 509 that shows the status of images that may be displayed on the frame device. However, picture box 523 is not limited to using first and second portions, but may utilize any number of portions to present information to the user of a frame device.

In one or more embodiments of the invention, first portion 505 shows what image delivery services the frame device associated with picture box 523 is subscribed to. For example, the frame associated with picture box 523 is scheduled to receive weekly subscription 503, daily subscription 505, and monthly subscription 507. The delivery intervals may be changed utilizing picture box 523. For example, it is possible to use picture box 523 to change weekly subscription 503 to a monthly subscription.

The second portion 509 shows what image data is currently intended for display frame devices associated with picture box 523. Second portion 509 comprises columns of information likely to be of use to the owner of the relevant frame device. For example, in one or more embodiments of the invention, columns that contain image name 512, status 511, date 513 and sender 514 are shown in second portion 509. However, any type of data that describes the images currently accessible to the frame device may be placed in the image name 512 column. For example, the image name 512 column may contain the actual file name, an alias associated with the image file, or a description of the image itself. Image name 512 may also contain a representation of the image data such as a thumbnail.

The status 511 column comprises information that represents the status of the image. For example, information that communicates whether an image is scheduled for display on the frame device is shown in status 511 column. Other information such as whether a new image was received, or whether the image may or may not be deleted can also be presented using status 511 column. One embodiment of the invention provides for the placement of any data that communicates the location and/or status of an image in status 511 column.

Picture box 523 may be configured to show a date 513 column. The date and/or time an image was received may be placed in date 513 column. Other data that is relevant to the receipt of an image may also be inserted into date 513 column. For example, the date a particular image was loaded into an associated frame device may also be placed in date 513 column.

Sender 514 column shows who sent the images shown in the picture box. In one or more embodiments of the invention, sender 514 column contains the picture mail address of the party who transmitted the image. The name and/or location the image was transmitted from may also be shown in sender 514 column.

Routing information may be also be defined using picture box 523. For example, if the user has the authority to control what is shown on multiple frame devices, the user may use the picture box to specify which images should be sent to which frame devices.

Picture box 253 also provides a mechanism for users to browse through the image data available for display. For example, users may search for images in a list of galleries by conducting a key word search of the galleries. Images held, in the galleries may be obtained from a person or entity, that provides stock images to the picture box. The user may obtain thumbnail views and full size views of the image data upon request. The user may also use the picture box to review all past, present, and future images displayed on the frame device. Users can also use the picture box to add, replace, or delete any image that is to be scheduled for display on the frame device. Thus, the picture box provides an interface for remotely controlling the behavior of the frame device.

The Image Delivery Service

In one or more embodiments of the invention, users may elect to subscribe a particular frame device to one or more image delivery services offered by the content providers. When the user subscribes to an image delivery service, customized image data is periodically delivered to the frame device designated by the user as the recipient. For example, if a user wishes to have an image summarizing the weather report regularly delivered to the frame device located in the user's house, the user may subscribe to an image delivery service that regularly transmits weather images to the picture mail address associated with the appropriate frame device. The user may control the date and time the image delivery service sends the image data. The user, for example, may specify that the weather report is only to be delivered at 7:00 a.m. on weekdays and is not to be delivered during the weekend. The invention also contemplates a system wherein the data and time the image delivery service transmits image data is predefined and not set by the user. For example, the image provider may determine when to send images to the picture mail account associated with a frame device. A number of different image delivery services are available to members of the picture mail community and each delivery service may transmit images that are illustrative of any kind of information. For example, images that represent post cards, greeting cards, art collections, live video feeds, or any other type of image data may be delivered to a frame device utilizing an image delivery service.

Frame Device Initialization

Figure 8:
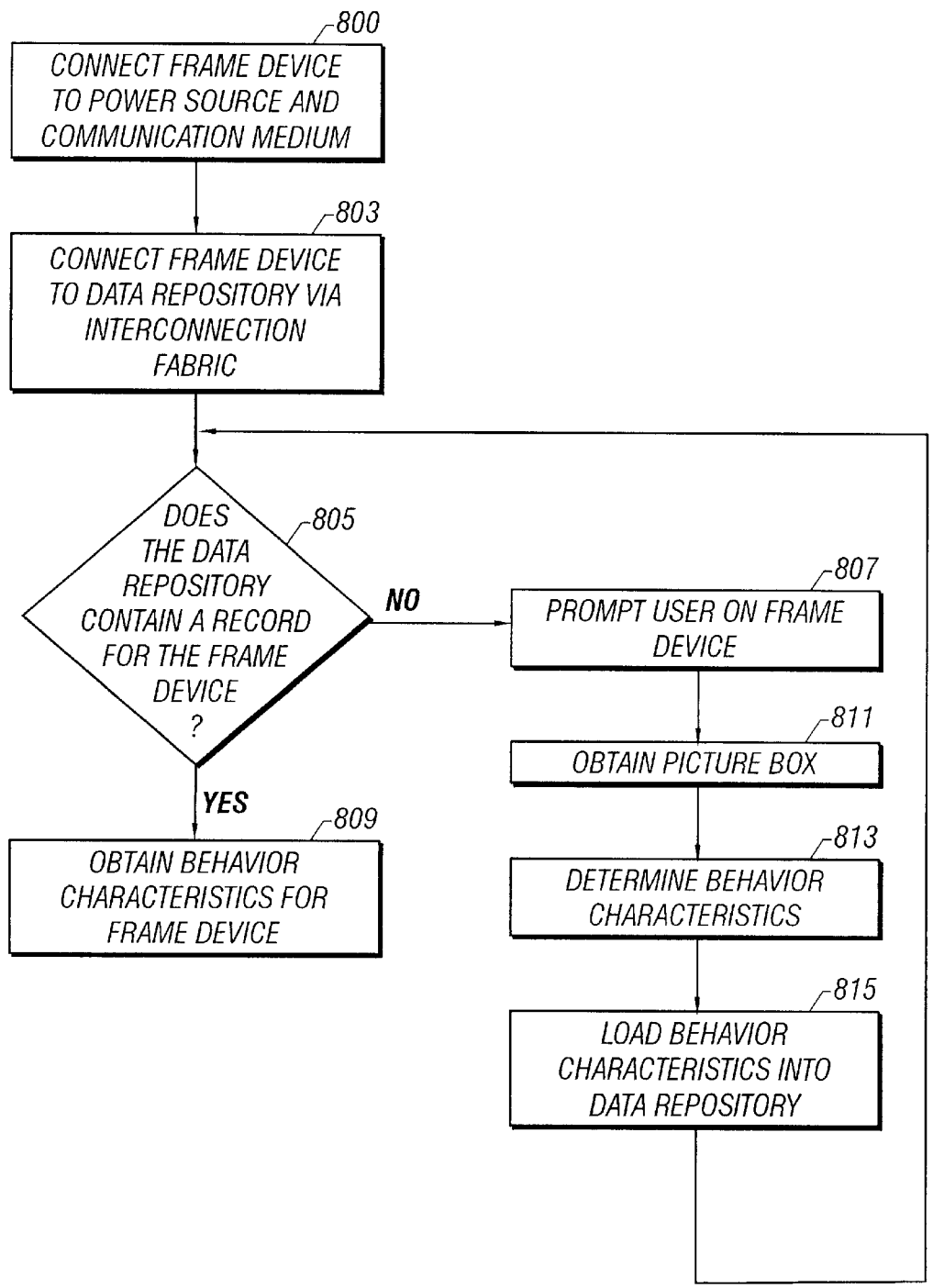
FIG. 8 is a flow chart illustrating the process utilized by one or more embodiments of the invention to register a frame device.

In one or more embodiments of the invention, the frame device initializes with the system in order to have the capability to obtain image data. The initialization process may occur with the aid of a user or it may occur automatically without user input. In either instance, users are given the opportunity to customize the behavior of the user's frame device(s). FIG. 8 illustrates the process utilized by one embodiment of the invention to initialize a frame device. The initialization process begins at step 800 when the frame device is connected to a power source and a communication medium such as a telephone line or network connection. The frame device may be configured to automatically connect via a wireless connection or the user may manually couple it to al power source and communication medium.

Once step 800 occurs, an embodiment of the invention proceeds to step 803. At step 803, the frame device initiates a connection to the data repository utilizing an interconnection fabric. In one or more embodiments of the invention, the frame device is configured so that can only connect to the data repository and cannot connect to other data sources that are available via the interconnection fabric. For example, the connection process may utilize an authentication scheme (e.g. encryption) to ensure the device connects to an authorized data repository and is not being directed to another data source masquerading as the authorized repository. When step 803 is complete, step 805 executes. At step 805, the data repository is analyzed to determine whether there is a record for the frame device initiating the connection.

If a record for the frame device is not located, step 807 executes and an image prompting the user to create a picture box account associated with that frame device is displayed to the user. Once the picture box account is created it provides the user with a way to set the behavioral characteristics of the frame device. In one or more embodiments of the invention, the frame device cannot properly connect to the data repository until the picture box account is generated. Thus, the invention contemplates generating a picture box by executing steps 811 and 813.

At step 811, a picture box is obtained. The user may obtain a picture box, and thereby join the picture mail community, by calling a toll free phone number to have another person initiate the generation of the picture box. Alternatively, the user may obtain a picture box by using a web browser and connecting to a web site that contains a mechanism for generating the picture box. The frame device may also automatically direct the system to generate a picture box if an attempt is made to connect and a picture box associated with the frame device attempting to make the connection does not exist. This may occur without requiring any input from the user. However, user input may be obtained if such input is deemed to be desirable. In one or more embodiments of the invention, however, the user may personalize the picture box by using the input mechanisms present on the frame device (e.g. the pushbutton switch).

Once the picture box is obtained, step 813 executes, at step 813 the behavior characteristics of the frame device is determined. The behavior characteristics may be established by default or customized according to the user's preferences. When the behavior characteristics are determined, step 815 executes. At step 815, the invention contemplates loading the behavior characteristics into the data repository for use by the frame device.

If the data repository already contains a record for the frame device initiating the connection, step 809 executes. At step 809, the frame device obtains the behavioral characteristics set via the picture box, by accessing the data repository. One embodiment of the invention loads the behavioral characteristics into flash memory residing on the corresponding frame device. Other data, such as software programs and/or image data may also be loaded into the frame device during step 809. Thus, functionality may be added to the software contained in the frame device without input from the user.

Self-Configuration Protocol

Figure 9:
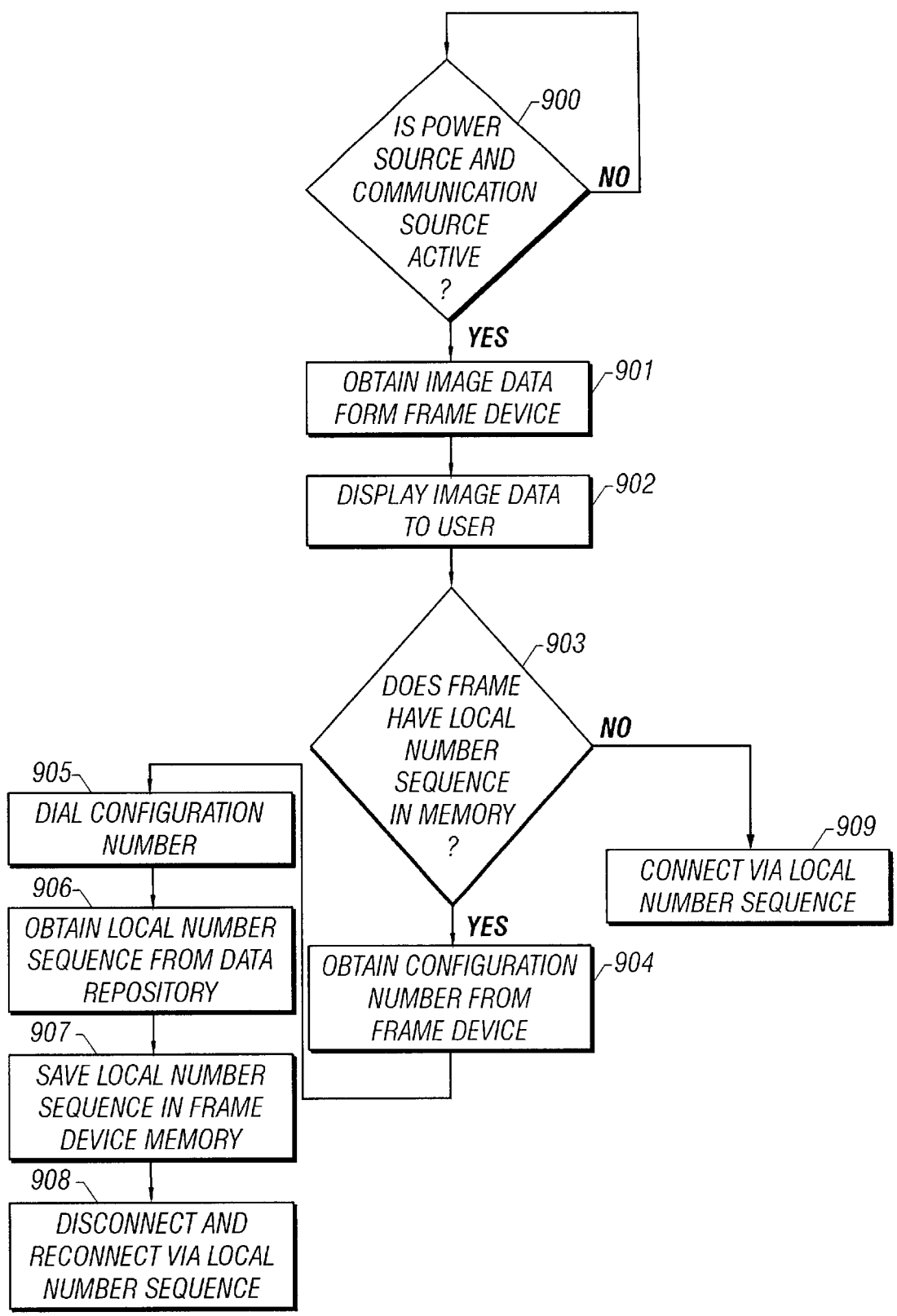
FIG. 9 illustrates the process utilized by one or more embodiments of the invention to initialize a frame device.

FIG. 9 illustrates another process that may be utilized by one or more embodiments of the invention to initialize a frame device. The initialization process begins at step 900 where the frame device determines if it is connected to a power source and a communication medium such as a telephone line or network connection. If so, the frame device proceeds to step 901 where it obtains image data from its own memory. At step 902, the image data is displayed to the user via display 313. In one or more embodiments of the invention, the image data directs the user to proceed to step 903 where the frame device manually initiates a communication session. The frame device may be configured to automatically initiate a communication session within a certain interval without requiring input from the user. For example, if the user connects the frame device to power source and a communication source, the frame device may initiate a communication session if the user does not manually do so within a certain time frame.

At step 903, the frame device determines whether it has local phone number information in resident memory. For example, if the frame device has not previously initiated a communication session the device will not have any local phone number information. If so, step 904 executes. At step 904, the device obtains a phone number (e.g. toll free phone number) from the memory of the frame device. This phone number is referred to as a configuration number sequence and may be permanently embedded into persistent memory (e.g. nonvolatile memory). The configuration number sequence is used only for configuration access and is parsimonious with the amount of time it remains connected. Once the frame device has the configuration number sequence, it dials the configuration number using a tone sequence (e.g. step 905). If that fails, the device may use pulse mode. When a connection is established, device proceeds to step 906 where it obtains one or more local phone numbers from a server computer (e.g. the data repository) provided by the frame service provider. The local phone number information is stored in memory at step 907.

Once step 907 executes, the device proceeds to step 908 where it disconnects from the configuration number and re-dials using one of the local numbers. If the frame device already has obtained a local number, step 909 executes and when the device is directed to initiate a connection it dials the local number stored in memory. Thus, the frame device is capable of automatically connecting to the interconnection fabric where it may obtain image data from the data repository without requiring input from the user. If the local phone number information is flushed from memory (e.g. by a power failure) or becomes inaccurate (e.g. because the user moved the physical location of the device), the device may use the toll free phone number to automatically reconfigure itself without prompting the user for additional input. Thus, each frame device is an intelligent device that can be easily maintained by novice or inexperienced users.

Image Collection/Submission Engine

Figure 6:
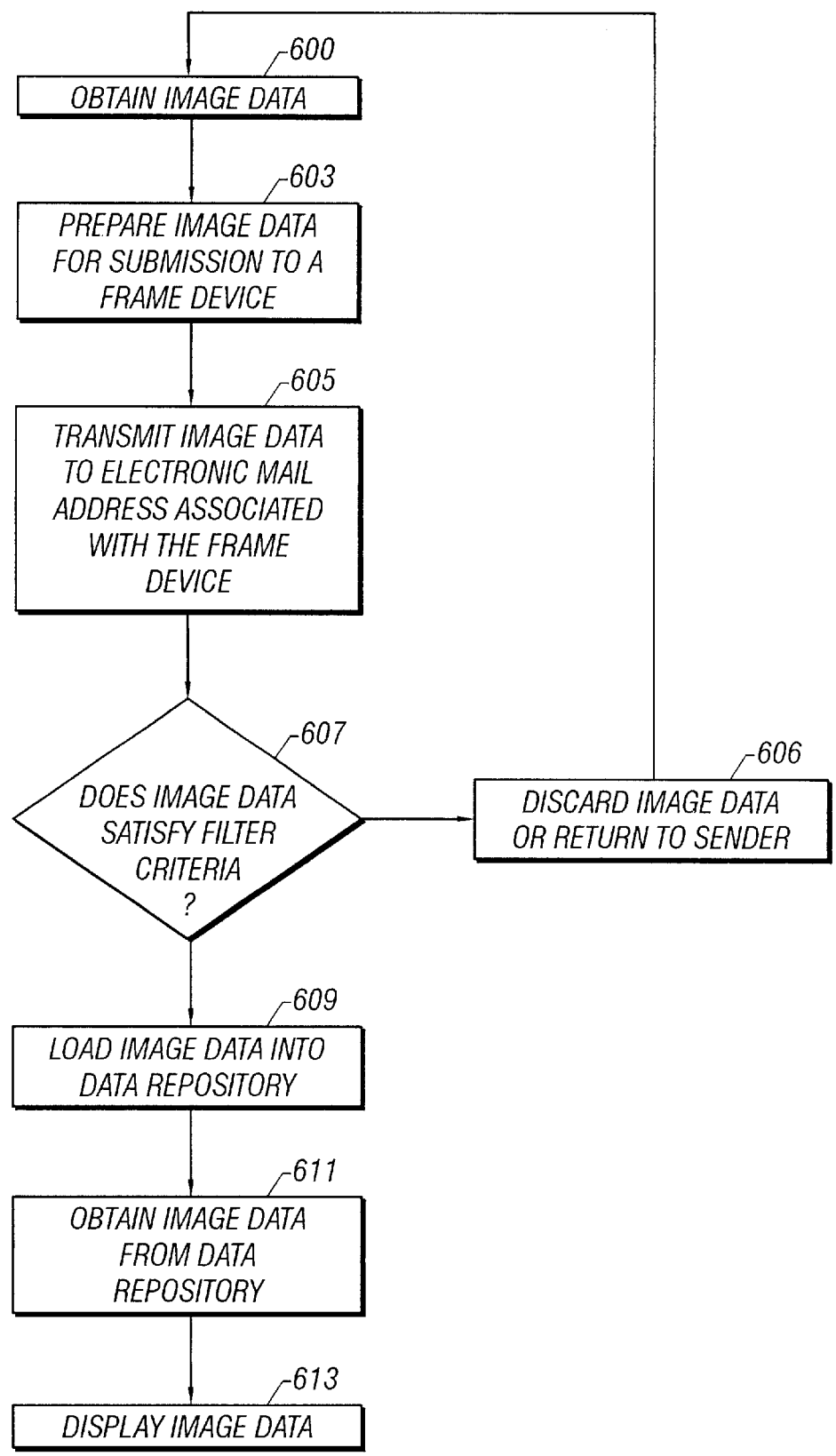
FIG. 6 is a flow chart illustrating the process utilized by one embodiment of the invention to prepare an image for display in a frame device.

FIG. 6 is a flow chart illustrating the process utilized by one embodiment of the invention to prepare an image for display in the display region of a particular frame device. At step 600, the user wishing to transmit the image data or a data collection engine, obtains the data and prepares it for submission to the picture mail address associated with a particular frame. The data repository may act as an image relay mechanism which holds the image data until the frame device connects to the repository for an update.

The data may be obtained from any source capable of providing one or more image files. For example, image data may be collected from a client computer, an image scanner, digital camera, or a memory device such as a hard drive. The data collection engine provides a mechanism for obtaining images from any image source accessible via an interconnection fabric such as the Internet. In one or more embodiments of the invention, the data collection engine is configured to obtain image data from any web server or web client connected to the interconnection fabric. For example, the user may direct the data submission engine to periodically collect one or more images from a networked device (e.g. a web server or series of web servers) by specifying a URL that identifies the location of the networked device containing image data that is to be collected.

At step 603, the image data is prepared for submission. An embodiment of the invention contemplates examining the image data to discern whether it meets a set of predetermined constraints. For example, if the display area of the frame device is a static width and height (e.g. 640×480 pixels), step 603 will obtain the dimensions of the display area and determine whether the image data will fit within the identified area without alteration. If the image does not fit, the image data may be altered to coincide with the dimensions of the frame device. The alteration process may scale the image, crop the image, change the resolution of the image, or otherwise modify the image so that it fits within the given display area. For example, if an image is 1024×768 pixels and the display area of a particular frame device is 640×480 pixels, the image may be appropriately scaled to fit into the 640×480 display area of the frame device. In one or more embodiments of the invention, step 603 is performed before the image data is transmitted to the data repository. However, software executing at the data repository or at the frame device may also be configured to prepare the image data for submission. One embodiment of the invention contemplates placing software configured to perform step 603 on any computer connected to the interconnection fabric.

In one or more embodiments of the invention, the data format of the submitted image is modified to conform to the preferences of the frame device. For example, if the submitted image is in BMP format and the frame device contains software or hardware that is capable of rendering JPEG images for. display, the image will be converted from BMP format to JPEG format to coincide with the needs of the frame device. The dimensional aspects of the image may be altered along with the data format. For example, a BMP image having a resolution of 1024×768 may be converted into a JPEG image having a resolution of 640×480. The color depth and other aspects of the image may also be modified. For example, the image alteration process may convert all JPEG images so that each image submitted to the system has a 12-bit color depth and is compressed to a size that does not exceed a certain size (e.g. 64 Kb). Submitted data is conformed to coincide with size and format parameters in order to prevent large, illegal, or improperly formatted files from consuming resources on the system. Additionally, filtering and modifying images before they are stored in the data repository provides a way to prevent excessively large images from consuming resources on the frame device. The data format conversion and the image resizing process may be performed without requiring input from the user. However, in one or more embodiments of the invention, the image alterations may,be presented to the user for approval and/or manual modification.

When a user initializes a frame device, that frame device becomes associated with a picture box. Each picture box is associated with a unique username and/or picture mail account. At step 605, the username and/or picture mail account information is utilized to provide a mechanism for transmitting image data to a frame device or series of frame devices. For example, if a user named user_1 initialized frame device XYZ with the system, another user could transmit image data to frame device XYZ by transmitting the image data to the picture mail address associated with user_1. A standard electronic mail client or a customized picture mail client may be utilized to transmit the picture mail and its associated image data. However, any interface capable of sending binary image data to a particular network address (e.g. a web-based interface) may also be utilized.

At step 607, the image data is analyzed to determine if it meets the filter criteria established by the user during the registration process (e.g. is the submitted image data from a person who belongs to the user's buddy list or, address book). In one embodiment of the invention step 607 is performed by a data population engine. The data population engine utilizes a specific set of filter. criteria to determine whether an image is appropriate for display on a frame device. An embodiment of the invention provides the user with an interface to set the criteria. For example, the filter criteria may be set using the picture box associated with that user. The user can, for example, prevent images arriving from certain picture mail and/or network locations from being displayed on the user's frame device(s).

The user may also elect to store images that arrive from certain locations in the data repository and not present the images for display until they are. reviewed and/or approved by the user. The user or any other authorized individual and/or entity may set the filter criteria. For example, the organization that controls the data repository may be given the authority to establish filter criteria. The user may set the filter criteria used by the data population engine using the picture box interface. Other interface devices capable of receiving input from a user, such as a telephone or Personal Desktop Assistant (PDA), may also be used to set the filter criteria.

When an image satisfies the filter criteria step 609 executes. At step 609, images are loaded into the appropriate portion of the data repository. For example, image data that is transmitted to the picture mail address of user_1 may be loaded into the record in the data repository created for user_1. Each time another image is submitted it is added to the appropriate record. Thus, the data repository may hold one or more images.

If the image data does not meet the filter criteria, the image data is discarded or returned to the address of the sender at step 606. In one or more embodiments of the invention, data that does not meet the filter criteria is stored in the data repository, but is not forwarded to a frame device until approved by the user.

Once image data resides in the data repository, step 611 executes. At step 611, the frame device obtains the image data set residing at the data repository. For example, the frame device may connect to the data repository utilizing the interconnection fabric and download the image data into memory. In one or more embodiments of the invention, the frame device periodically connects to the data repository. The frequency of the connections may be determined by the user via the picture box interface or by a party authorized to access the picture box. The device may also automatically determine the connection frequency without requiring input from the user.

Once the image data resides in flash memory, step 613 executes and the image data is displayed on the frame device's display mechanism according to the display preferences expressed via the picture box.

Conversation/Security Protocol

Figure 10:
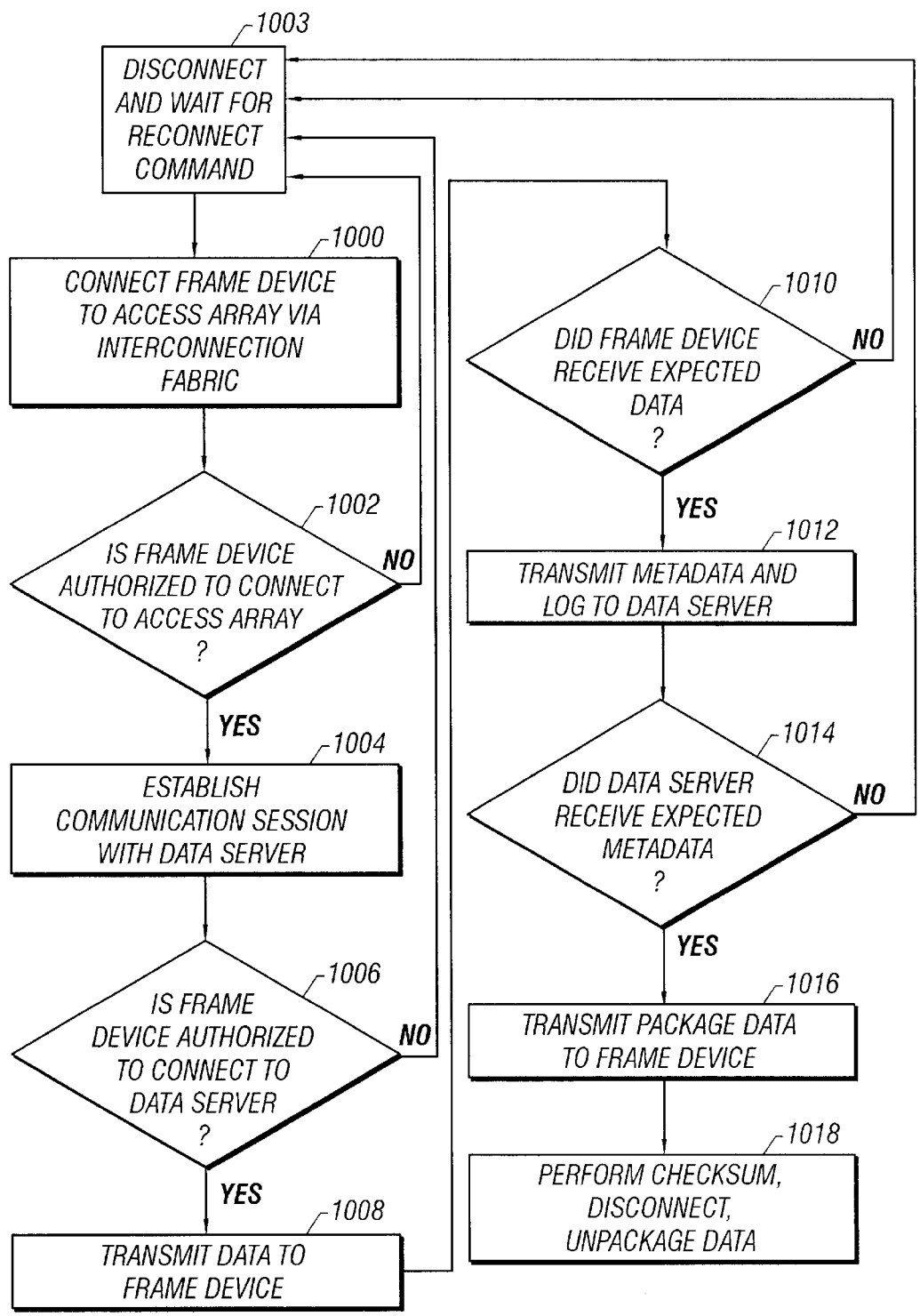
FIG. 10 illustrates the process used by one or more embodiments of the invention to obtain new image data and/or software updates.

FIG. 10 illustrates the process used by one or more embodiments of the invention to obtain new image data and/or software updates. At step 1000, the frame device establishes a connection to the access array at the scheduled interval via the interconnection fabric. For example, the frame device may utilize the communication interface to connect to an ISP or other entity with an access array such as a modem pool. The frame device obtains the information it needs to initiate the connection from flash memory (e.g. phone number information, unique identifier such as a serial number, and password information). Other information such as the network router information, subnet mask, and domain name service information is drawn directly from the ISP using DHCP or some other dynamically addressing protocol. Thus, the device may obtain the information it needs to connect without input from the user. Once the connection is initiated, the process proceeds to step 1002 where the ISP or entity having control of the access array determines if the frame device is authorized to connect to the access array. If for example, the frame device connects using a modem and PPP, the access array may prompt the device for password information that may be automatically entered by the frame device. In one or more embodiments of the invention, the password to be entered is determined algorithmically by the frame device. If the correct password information is entered the process proceeds to step 1004, otherwise step 1003 executes and the frame device disconnects and waits for a reconnect command to be initiated.

At step 1004, the frame device establishes a communication session with a data, server. This may be done, for example, using FTP to connect to the data server. However, the invention contemplates the use of other communication protocols such as NFS, tFTP, HTTP, SMTP, POP3, IMAPI, or any other protocol that can be used to transport data between two or more sources, to establish a communication session with the data server.

When the communication session is initiated the data server executes step 1006 where a challenge is made to ensure the frame device is authentic. If the frame device correctly responds to the challenge, step 1008 executes. Otherwise, step 1003 executes and the frame device disconnects. At step 1008, the data server transmits data to the frame device. For example, the data server may enter binary mode and transmit an authentication file to the frame device in response to the device's request for data (e.g. via the GET command). Once the data is sent step 1010 executes. At step 1010, the frame device examines the data it received to determine if the data is the type of data expected. For example, the frame device may authenticate the data by checking the size, contents, or encryption sequence associated with the data to determine if the transmitted data came from an authorized data server. If the frame device received the expected data (e.g. the encryption sequence is authentic), it proceeds to step 10012. If the frame did not receive the kind of data expected, step 1003 executes and the frame disconnects from the data server and awaits a reconnect command.

At step 1012, the data server transmits metadata and/or a log file to the data, server. The metadata file contains status information about the frame such as configuration information or connectivity information. The metadata file may also contain new or additional parameters and/or functionality that are to be added to the device (e.g. an on board software update). The log file contains a record of the frame devices past activities. For example, the log may contain a list of recent connection attempts. Any connection failures may be flagged and later analyzed to determine the cause of the failure. After the frame device transmits the metadata to the frame device step 1014 executes. At step 1014, the data server determines if it received the kind of metadata that was expected. For example, the data server may check to see if the metadata file contains all the expected parameters. In one or more embodiments of the invention, the data server checks the received data to ensure that the data is the proper type of data and that it has not been modified by an unauthorized user (e.g. by examining an encryption sequence associated with the metadata). If the metadata is properly authenticated, the data server executes step 1016 where it transmits package data to the frame device. The package data may contain one or more images that are scheduled for display on the frame device, software updates, and additional parameters needed to direct the behavior characteristics of the frame device. Other information that is useful to the operation of the frame device such as timing information may also be placed in the package. Once the package is received by the frame device step 1018 executes. At step 1018, a checksum operation is performed to ensure that the entire package scheduled for transmission was indeed transmitted. If the checksum results in the expected response the frame device disconnects and begins to unpackage the package data. If the package data is compressed, the frame device decompresses the package and loads the contents of the package into memory. Image files found in the package may be stored in DRAM until they are rendered for display.

Embodiment of Computer Execution Environment (Hardware)

Figure 7:
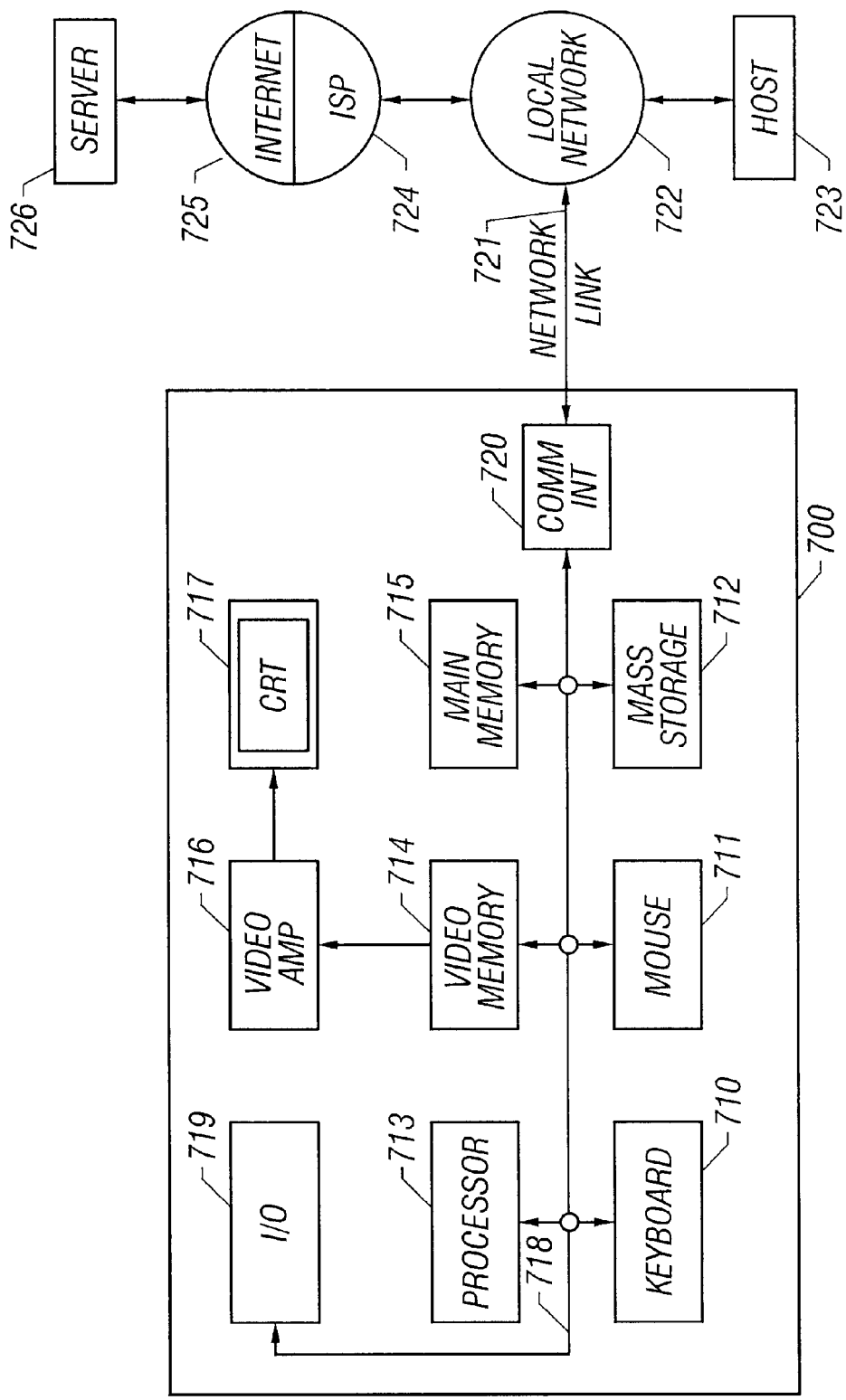
FIG. 7 illustrates an embodiment of the invention that may be utilized to access the picture box interface.

An embodiment of the invention utilized to access the picture box interface can be implemented as computer software in the form of computer readable code executed on a general purpose computer such as computer 700 illustrated in FIG. 7, or in the form of bytecode class files executable within a Java™ runtime environment running on such a computer, or in the form of bytecodes running on a processor (or devices enabled to process bytecodes) existing in a distributed environment (e.g., one or more processors on a network). A keyboard 710 and mouse 711 are coupled to a system bus 718. The keyboard and mouse are for introducing user input to the computer system and communicating that user input to processor 713. Other suitable input devices may be used in addition to, or in place of, the mouse 711 and keyboard 710. I/O (input/output) unit 719 coupled to system bus 718 represents such I/O elements as a printer, A/V (audio/video) I/O, etc.

Computer 700 includes a video memory 714, main memory 715 and mass storage 714, all coupled to system bus 718 along with keyboard 710, mouse 711 and processor 713. The mass storage 714 may include both fixed and removable media, such as magnetic, optical or magnetic optical storage systems or any other available mass storage technology. Bus 718 may contain, for example, thirty-two address lines for addressing video memory 714 or main memory 715. The system bus 718 also includes, for example, a 64bit data bus for transferring data between and among the components, such as processor 713, main memory 715, video memory 714 and mass storage 714. Alternatively, multiplex data/address lines may be used instead of separate data and address lines.

In one or more embodiments of the invention, the processor 713 is a microprocessor manufactured by Sun Microsystems, Inc., such as the SPARC™ microprocessor, or a microprocessor manufactured by Motorola, such as the 680X0 processor, or a microprocessor manufactured by Intel, such as the 80X86, or Pentium processor. However, any other suitable microprocessor or microcomputer may be utilized. Main memory 715 is comprised of dynamic random access memory (DRAM). Video memory 714 is a dual-ported video random access memory. One port of the video memory 714 is coupled to video amplifier 716. The video amplifier 716 is used to drive the cathode ray tube (CRT) raster monitor 717. Video amplifier 716 is well known in the art and may be implemented by any suitable apparatus. This circuitry converts pixel data stored in video memory 714 to a raster signal suitable for use by monitor 717. Monitor 717 is a type of monitor suitable for displaying graphic images.

Computer 700 may also include a communication interface 740 coupled to bus 718. Communication interface 740 provides a two-way data communication coupling via a network link 741 to a local network 744. For example, if communication interface 740 is an integrated services digital network (ISDN) card or a modem, communication interface 740 provides a data communication connection to the corresponding type of telephone line, which comprises part of network link 741. If communication interface 740 is a local area network (LAN) card, communication interface 740 provides a data communication connection via network link 741 to a compatible LAN. Wireless links are also possible. In any such implementation, communication interface 740 sends and receives electrical, electromagnetic or optical signals which carry digital data streams representing various types of information.

Network link 741 typically provides data communication through one or more networks to other data devices. For example, network link 741 may provide a connection through local network 744 to local computational service provider computer 743 or to data equipment operated by an Internet Service Provider (ISP) 744. ISP 744 in turn provides data communication services through the world wide packet data communication network now commonly referred to as the "Internet" 745. Local network 744 and Internet 745 both use electrical, electromagnetic or optical signals which carry digital data streams. The signals through the various networks and the signals on network link. 741 and through communication interface 740, which carry the digital data to and from computer 700, are exemplary forms of carrier waves transporting the information.

Computer 400 can send messages and receive data, including program code, through the network(s), network link 741, and communication interface 740. In the Internet example, remote computational service provider computer 746 might transmit a requested code for an application program through Internet 745, ISP 744, local network 744 and communication interface 740.

The received code may be executed by processor 713 as it is received, and/or stored in mass storage 714, or other non-volatile storage for later execution. In this manner, computer 700 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, computational service providers on a network, and carrier waves.

The computer systems described above are for purposes of example only. An embodiment of the invention may be implemented in any type of computer system or programming or processing environment. When a general purpose computer system such as the one described executes the process and process flows described herein, it is configured to adaptably distribute data to one or more recipient devices.

Thus, a method and apparatus for distributing picture mail to a frame device community is described.

APPENDIX A

Database Tables

| Table Name | Fields |
|---|---|
| member | member_id |
| | rating_id (FK) |
| | member_nickname |
| | last_name |
| | first_name |
| | middle_initial |
| | member_email_addr |
| | address_1 |
| | address_2 |
| | address_3 |
| | city |
| | state |
| | postal_code |
| | country |
| | birth_date |
| | birth_month |
| | birth_year |
| | birth_day |
| | member_username |
| | member_passwd |
| lock | lock_status_id |
| | lock_status_desc |
| picture | picture_id (FK) |
| | lock_status_id(FK) |
| | file_name |
| | file_location |
| | pict_info |
| | pict_copyright |
| | pict_author |

APPENDIX A-continued

| Table Name | Fields |
|---|---|
| | pict_creation_date |
| | pict_owner |
| picture_box | member_id (FK) |
| | content_id(FK) |
| | container_type_id(FK) |
| | picture_expiration_date |
| content | content_id |
| | content_parent_type_id(FK) |
| | picture_id(FK) |
| content_parent_type | content_parent_type_id(FK) |
| | content_parent_type |
| rating | rating_id |
| | rating_level |
| channel | channel_id |
| | channel_provider_id(FK) |
| | gallery_id(FK) |
| | rating_id(FK) |
| | channel_desc |
| | channel_update_freq |
| | channel_update_timestamp |
| channel_provider | channel_provider_id(FK) |
| | channel_provider_name |
| gallery_provider | gallery_provider_id(FK) |
| | gallery_provider_name |
| gallery | gallery_id |
| | rating_id(FK) |
| | gallery_provider_id(FK) |
| | gallery_name |
| | gallery_desc |
| location | location_id |
| | postal_code |
| | country_id |
| | area_code |
| | location_utc_offset |
| isp | isp_id |
| | location_id(FK) |
| | isp_name |
| frame | frame_id |
| | rating_id(FK) |
| | frame_parent_id(FK) |
| | member_id(FK) |
| | frame_primary_phone_id(FK) |
| | frame_secondary_phone_id(FK) |
| | frame_tertiary_phone_id(FK) |
| | location_id(FK) |
| | frame_serial_number |
| | frame_lights_one_timestamp |
| | frame_lights_off_timestamp |
| | frame_callback_timestamp |
| | frame_display_mode |
| | frame_user |
| | frame_pwd |
| | frame_label_number |
| | frame_software_version |
| | frame_hardware_version |
| | frame_name |
| | public_directory |
| phone | phone_id |
| | isp_id(FK) |
| | primary_phone_nimber |
| | secondary_phone_nimber |
| | tertiary_phone_nimber |
| | primary_dns |
| | secondary_dns |
| frame_queue | frame_id(FK) |
| | content_id(FK) |
| | container_type_id(FK) |
| | slide_show_order |
| | slide_show_member |
| | picture_expiration_date |
| | picture_lock |
| | frame_queue_date |
| frame_history | frame_id(FK) |
| | history_timestamp |
| | frame_primary_phone_id |
| | frame_secondary_phone_id |
| | frame_tertiary_phone_id |
| | frame_callback_timestamp |
| | frame_software_version |

APPENDIX A-continued

| | | |
|---|---|---|
| frame_history_detail | frame_id(FK) | |
| | history_timestamp(FK) | |
| | event_timestamp | |
| | event_id(FK) | |
| | data_primary | |
| | data_secondary | |
| frame_events | event_id | |
| | event_dsc | |
| | event_severity | |
| buddy | member_id(FK) | |
| | buddy_member_id(FK) | |
| | buddy_name | |
| frame_parent | frame_parent_id(FK) | |
| account | member_id(FK) | |
| | frame_id(FK) | |
| | acct_created_date | |
| | acct_status | |

Relationsip Table

| Table name | Relationship description | Associated Table Name |
|---|---|---|
| member | submits | picture |
| | may be a | channel_provider |
| | may be a | galerry_provider |
| | owns | frame |
| | maintains | accounts |
| | may be a | frame_parent |
| | owns | buddy |
| | chooses | buddy |
| | owns | picture_box |
| rating | restricts | member |
| | ranks | gallery |
| | ranks | channel |
| | restricts | frame |
| lock | locks | picture |
| gallery_provider | provides | gallery |
| gallery | captures | channel |
| | holds | content |
| channel_provider | provides | channel |
| phone | is dialed by | frame |
| frame | records | frame_history |
| | has | frame_queue |
| | bills | account |
| frame_history | contains | frame_history_detail |
| frame_event | describes | frame_history_detail |
| frame_parent | controls | frame |
| container_type | describes | frame_queue |
| | describes | picture_box |
| picture | fills | content |
| content | fills | picture_box |
| | fills | |
| content_parent_type | describes | content |

What is claimed is:

1. A system for distributing image data comprising:

at least one frame device configured to operate according to preferences defined by a user, said at least one frame device comprising a border region modeled to resemble a picture frame designed to circumscribe printed photographs;

a user interface coupled to at least one server system via a network wherein said user interface is physically separable from said at least one frame device and configured to obtain image data and said preferences from said user and provide said image data and said preferences to said at least one server system;

said at least one server system coupled to said at least one frame device via said network, wherein said at least one server system is configured to periodically relay said image data and said preferences to said at least one frame device when said at least one frame device automatically issues a request for said image data.

2. The system of claim 1 wherein said at least one frame device stores said preferences at said at least one frame device in at least one behavior module.

3. The system of claim 2 wherein said preferences are also stored in said at least one server system.

4. The system of claim 2 wherein said at least one frame device periodically obtains an update for said at least one behavior module by obtaining said preferences from said at least one server system.

5. The system of claim 2 wherein said at least one behavior module directs said at least one frame device to obtain said image data from a content provider.

6. The system of claim 1 wherein input to said user interface is permitted when said user is authenticated by said at least one server system.

7. The system of claim 1 wherein said at least one frame device initiates said request for said image data at intervals obtained via said user interface.

8. A method for distributing picture mail via a network to a community of frame devices comprising:

connecting at least one frame device to a network wherein said at least one frame device comprises a border region modeled to resemble a picture frame designed to circumscribe printed photographs;

obtaining a configuration number sequence from a memory located in said at least one frame device; using said configuration number sequence to initiate a connection to at least one data server via said network;

obtaining a localized number sequence from said at least one data server;

terminating said connection to said at least one data server;

reconnecting to said at least one data server via said network using said localized number sequence;

presenting a user interface to a user associated with said at least one frame device, wherein said presenting executes at a location physically separable from said at least one frame device;

obtaining image data from said user via said user interface;

providing said image data to said at least one frame device via said network;

storing said image data in said memory of said at least one frame device.

9. The method of claim 8 wherein said localized number sequence is stored in said memory of said at least one frame device.

10. The method of claim 9 wherein said at least one frame device utilizes said localized number sequence when said localized number sequence resides in said memory.

11. The method of claim 8 wherein said configuration number sequence is used when said localized number sequence does not reside in said memory.

12. The method of claim 8 wherein said obtaining said image data from said user via said user interface further comprises storing said image data in at least one data repository accessible via said network.

13. The method of claim 12 further comprising:

obtaining an update of said at least one frame device's onboard software from said at least one data repository via said network.

14. The method of claim 13 wherein said update to said onboard software modifies said at least one frame devices functionality.

15. The method of claim 14 wherein said at least one frame device determines whether said update to said onboard software is current.

16. The method of claim 15 wherein said obtaining said update of said onboard software executes when said update to said onboard software is not current.

17. The method of claim 8 wherein said step of obtaining said configuration number sequence from said memory located in said at least one frame device occurs automatically.

* * * * *

(12) INTER PARTES REEXAMINATION CERTIFICATE (858th)

United States Patent
Schiller et al.

(10) Number: US 6,442,573 C1
(45) Certificate Issued: Apr. 18, 2014

(54) METHOD AND APPARATUS FOR DISTRIBUTING PICTURE MAIL TO A FRAME DEVICE COMMUNITY

(75) Inventors: Dean Schiller, Glendale, CA (US); Paul Yanover, Los Angeles, CA (US)

(73) Assignee: Ceiva Logic, Inc., Burbank, CA (US)

Reexamination Request:
No. 95/000,402, Jan. 26, 2009

Reexamination Certificate for:
Patent No.: 6,442,573
Issued: Aug. 27, 2002
Appl. No.: 09/458,849
Filed: Dec. 10, 1999

(51) Int. Cl.
*H04L 29/06* (2006.01)
*H04L 12/58* (2006.01)
*H04L 29/08* (2006.01)
*H04L 12/18* (2006.01)

(52) U.S. Cl.
USPC ........... 715/210; 358/403; 709/218; 715/209; 715/719

(58) Field of Classification Search
None
See application file for complete search history.

(56) References Cited

To view the complete listing of prior art documents cited during the proceeding for Reexamination Control Number 95/000,402, please refer to the USPTO's public Patent Application Information Retrieval (PAIR) system under the Display References tab.

*Primary Examiner* — Matthew Heneghan

(57) ABSTRACT

A method and apparatus for distributing picture mail to a frame device community is described. The present invention comprises one or more interconnected frame devices. Each frame device has a display region (e.g. an LCD) surrounded with a border region modeled to resemble a traditional picture frame. The border region may be comprised of wood, plastic, or any other aesthetically pleasing compound. Each frame device is configured to connect to an interconnection fabric to periodically obtain image data from a centralized repository and then display that data according to criteria established by an authorized user. The data repository is populated with image data via the image collection process. In one or more embodiments of the invention, the user may specify filter criteria which establishes what network addresses (e.g. picture mail address) are authorized to populate the data repository. The filter criteria and other information such as the behavior characteristics of each frame device are established and/or managed via a picture box. The picture box resides on a server computer and may be obtained by the user upon demand.

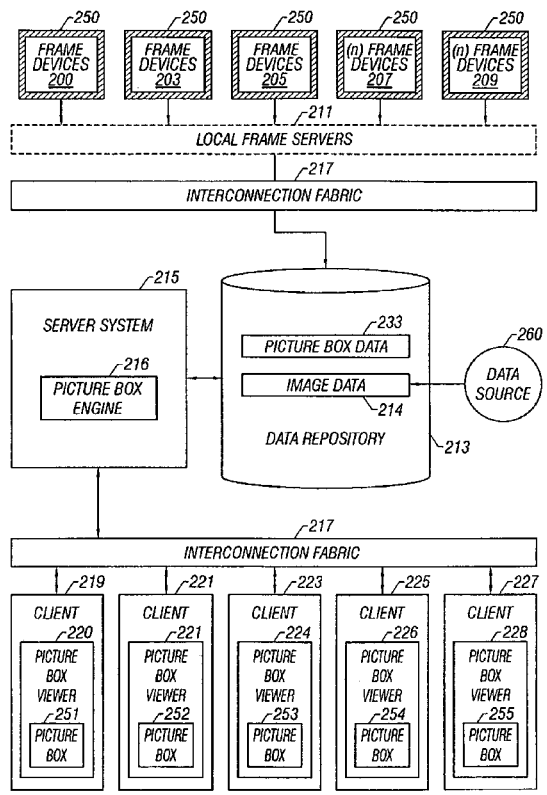

US 6,442,573 C1

INTER PARTES
REEXAMINATION CERTIFICATE
ISSUED UNDER 35 U.S.C. 316

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 7-12 and 17 are cancelled.

Claims 2, 4, 5 and 13-16 are determined to be patentable as amended.

Claim 3, dependent on an amended claim, is determined to be patentable.

New claims 18 and 19 are added and determined to be patentable.

Claim 6 was not reexamined.

2. [The system of claim 1] *A system for distributing image data comprising:*
   at least one frame device configured to operate according to preferences comprising an image display list defined by a user, said at least one frame device comprising a border region modeled to resemble a picture frame designed to circumscribe printed photographs;
   a user interface coupled to at least one server system via a network wherein said user interface is physically separable from said at least one frame device and configured to obtain image data and said preferences from said user and provide said image data and said preferences to said at least one server system;
   said at least one server system coupled to said at least one frame device via said network, wherein said at least one server system is configured to generate package data comprising said image data and said preferences and to periodically relay said package data comprising said image data and said preferences to said at least one frame device when and in response to said at least one frame device automatically initiating communication with said server system and issuing a request for a current one of said package data comprising said image data and said preferences,
   wherein said at least one frame device [stores] *is configured to authenticate said at least one server system before storing* said *image data and said* preferences *from said current one of said package data* at said at least one frame device in [at least one behavior module] *memory of said frame device.*

4. [The system of claim 2] *A system for distributing image data comprising:*
   at least one frame device configured to operate according to preferences defined by a user, said at least one frame device comprising a border region modeled to resemble a picture frame designed to circumscribe printed photographs;
   a user interface coupled to at least one server system via a network wherein said user interface is physically separable from said at least one frame device and configured to obtain image data and said preferences from said user and provide said image data and said preferences to said at least one server system;
   said at least one server system coupled to said at least one frame device via said network, wherein said at least one server system is configured to periodically relay said image data and said preferences to said at least one frame device when said at least one frame device automatically issues a request for said image data, wherein said at least one frame device stores said preferences and operating system software for said frame device at said at least one frame device in memory of said frame device, and wherein said at least one frame device [periodically] obtains an update for said [at least one behavior module by obtaining said preferences] *operating system software* from said at least one server system.

5. [The system of claim 2] *A system for distributing image data comprising:*
   at least one frame device configured to operate according to preferences comprising an image display list defined by a user, said at least one frame device comprising a border region modeled to resemble a picture frame designed to circumscribe printed photographs;
   a user interface coupled to at least one server system via a network wherein said user interface is physically separable from said at least one frame device and configured to obtain image data and said preferences from said user and provide said image data and said preferences to said at least one server system;
   said at least one server system coupled to said at least one frame device via said network, wherein said at least one server system is configured to generate package data comprising said image data and said preferences and to periodically relay said package data comprising said image data and said preferences to said at least one frame device when and in response to said at least one frame device automatically initiating communication with said server system and issuing a request for a current one of said package data comprising said image data and said preferences,
   wherein said current one of said package data comprises a software update [at least one behavior module directs said at least one frame device to obtain said image data from a content provider].

13. [The method of claim 12] *A method for distributing picture mail via a network to a community of frame devices comprising:*
   connecting at least one frame device to a network wherein said at least one frame device comprises operating system software located inside said frame device and a border region modeled to resemble a picture frame designed to circumscribe printed photographs;
   obtaining a configuration number sequence from a memory located in said at least one frame device; using said configuration number sequence to initiate a connection to at least one data server via said network;
   obtaining a localized number sequence from said at least one data server;
   terminating said connection to said at least one data server;
   reconnecting to said at least one data server via said network using said localized number sequence;
   presenting a user interface to a user associated with said at least one frame device, wherein said presenting executes at a location physically separable from said at least one frame device;

obtaining image data from said user via said user interface;

providing said image data to said at least one frame device via said network;

storing said image data in said memory of said at least one frame device, wherein said obtaining said image data from said user via said user interface further comprises storing said image data in at least one data repository accessible via said network;

further comprising: obtaining an update of said at least one frame device's onboard *operating system* software from said at least one data repository via said network.

14. The method of claim 13 wherein said update to said onboard *operating system* software modifies said at least one frame device's functionality.

15. The method of claim 14 wherein said at least one frame device determines whether said update to said onboard *operating system* software is current.

16. The method of claim 15 wherein said obtaining said update of said onboard *operating system* software executes when said update to said onboard *operating system* software is not current.

18. A system for distributing image data comprising:

at least one digital picture frame comprising memory and operating system software located inside said digital picture frame configured to operate according to preferences comprising an image display list defined by a user, said at least one digital picture frame comprising a border region modeled to resemble a picture frame designed to circumscribe printed photographs;

a user interface coupled to at least one server system via a network wherein said user interface is physically separable from said at least one digital picture frame and configured to obtain image data and said preferences from said user and provide said image data and said preferences to said at least one server system;

said at least one server system coupled to said at least one digital picture frame via said network, wherein said at least one server system is configured to generate package data comprising said image data and said preferences and to periodically relay said package data comprising said image data and said preferences to said at least one digital picture frame when and in response to said at least one digital picture frame automatically initiating communication with said server system and issuing a request for a current one of said package data comprising said image data and said preferences, wherein said at least one digital picture frame is configured to authenticate said at least one server system before storing said image data and said preferences from said current one of said package data at said at least one frame device in said memory.

19. A system for distributing image data comprising:

at least one digital picture frame comprising memory and operating system software located inside said digital picture frame configured to operate according to preferences defined by a user, said at least one digital picture frame comprising a border region modeled to resemble a picture frame designed to circumscribe printed photographs;

a user interface coupled to at least one server system via a network wherein said user interface is physically separable from said at least one digital picture frame and configured to obtain image data and said preferences from said user and provide said image data and said preferences to said at least one server system;

said at least one server system coupled to said at least one digital picture frame via said network, wherein said at least one server system is configured to periodically relay said image data and said preferences to said at least one digital picture frame when said at least one digital picture frame automatically issues a request for said image data and wherein said at least one digital picture frame is configured to obtain an update for said operating system software from said at least one server system.

* * * * *